(12) United States Patent
Psota et al.

(10) Patent No.: US 11,393,088 B2
(45) Date of Patent: Jul. 19, 2022

(54) ANIMAL DETECTION BASED ON DETECTION AND ASSOCIATION OF PARTS

(71) Applicant: NUtech Ventures, Lincoln, NE (US)

(72) Inventors: Eric T. Psota, Lincoln, NE (US); Lance C. Perez, Lincoln, NE (US); Ty Schmidt, Eagle, NE (US); Benny Mote, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 126 days.

(21) Appl. No.: 16/913,679

(22) Filed: Jun. 26, 2020

(65) Prior Publication Data

US 2020/0410669 A1 Dec. 31, 2020

Related U.S. Application Data

(60) Provisional application No. 62/867,626, filed on Jun. 27, 2019, provisional application No. 63/040,951, filed on Jun. 18, 2020.

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 7/77* (2017.01); *G06V 40/10* (2022.01);
(Continued)

(58) Field of Classification Search
CPC . G06T 7/0012; G06T 7/11; G06T 7/77; G06T 2207/30188; G06T 2207/30232; G06V 40/10; G06V 40/103
See application file for complete search history.

(56) References Cited

U.S. PATENT DOCUMENTS 10,839,203 B1 * 11/2020 Guigues .................. G06T 7/251
11,182,603 B1 * 11/2021 Li ........................... G06T 7/136
(Continued)

OTHER PUBLICATIONS

Gall et al. "Motion capture using joint skeleton tracking and surface estimation." 2009 IEEE Conference on Computer Vision and Pattern Recognition. IEEE, 2009. (Year: 2009).*
(Continued)

*Primary Examiner* — Katrina R Fujita
(74) *Attorney, Agent, or Firm* — Fish & Richardson P.C.

(57) ABSTRACT

A method of recognizing animals includes recognizing a plurality of body parts of a plurality of animals based on at least one image of the animals, in which the plurality of body parts include a plurality of types of body parts, including determining first estimated positions of the recognized body parts in the at least one image. The method includes estimating a plurality of first associations of body parts based on the at least one image of the animals, each first association of body parts associates a body part of an animal with at least one other body part of the same animal, including determining relative positions of the body parts in each estimated first association of body parts in the at least one image. The method includes determining, based on the first estimated positions of the recognized body parts and the relative positions of the body parts in the estimated first associations of body parts, second associations of body parts in which each second association of body parts associates a recognized body part of an animal with at least one other recognized body part of the same animal; and recognizing individual animals in the at least one image based on the second associations of body parts of the animals.

22 Claims, 20 Drawing Sheets
(15 of 20 Drawing Sheet(s) Filed in Color)

Image with part detections

(51) Int. Cl.
  *G06T 7/77* (2017.01)
  *G06V 40/10* (2022.01)
(52) U.S. Cl.
  CPC .. *G06V 40/103* (2022.01); *G06T 2207/30188* (2013.01); *G06T 2207/30232* (2013.01)

(56) References Cited

U.S. PATENT DOCUMENTS

| | | | | |
|---|---|---|---|---|
| 11,232,294 | B1* | 1/2022 | Banerjee | G06V 20/52 |
| 2012/0128255 | A1* | 5/2012 | Aoyama | G06V 40/10 |
| | | | | 382/195 |
| 2015/0146939 | A1* | 5/2015 | Datta | A61B 5/112 |
| | | | | 382/110 |
| 2019/0096066 | A1* | 3/2019 | Chen | G06T 7/11 |
| 2019/0138801 | A1* | 5/2019 | Psota | G06T 7/73 |
| 2020/0143157 | A1* | 5/2020 | Borchersen | G06V 40/10 |
| 2021/0037785 | A1* | 2/2021 | Yabe | A01K 29/00 |
| 2021/0153479 | A1* | 5/2021 | Mindel | G06T 7/0012 |
| 2021/0386035 | A1* | 12/2021 | Liao | G06K 9/6267 |

OTHER PUBLICATIONS

Giancardo et al. "Automatic visual tracking and social behaviour analysis with multiple mice." PloS one 8.9 (2013): e74557. (Year: 2013).*

Kashiha et al. "Automatic identification of marked pigs in a pen using image pattern recognition." Computers and electronics in agriculture 93 (2013): 111-120. (Year: 2013).*

[No Author Listed], "PIC North America. Standard Animal Care: Daily Routines," In Wean to Finish Manual, 2014, 23-24.

Ahrendt et al., "Development of a real-time computer vision system for tracking loose-housed pigs," Comput. Electron. Agric., 2011, 76:169-174.

Alvarenga et al., "Using a three-axis accelerometer to identify and classify sheep behaviour at pasture," Appl. Anim. Behav. Sci., 2016, 181:91-99.

Andriluka et al., "2d human pose estimation: New benchmark and state of the art analysis," Proceedings of the IEEE Conference on computer Vision and Pattern Recognition, 2014, 3686-3693.

Ardö et al., "Convolutional neural network-based cow interaction watchdog," IET Comput. Vis., 2017, 12:171-177.

Badrinarayanan et al., "SegNet: A Deep Convolutional Encoder-Decoder Architecture for Image Segmentation," IEEE Trans. Pattern Anal. Mach. Intell., 2017, 39:2481-2495.

Banhazi et al., "Precision livestock farming: An international review of scientific and commercial aspects," Int. J. Agric. Biol. Eng., 2012, 5:1-9.

Bochinski et al., "High-speed tracking-by-detection without using image information," IEEE, 2017, 1-6.

Burgunder et al., "Fractal measures in activity patterns: Do gastrointestinal parasites affect the complexify of sheep behaviour?" Appl. Anim. Behav. Sci., 2018, 205:44-53.

Cao et al., "Realtime Multi-Person 2D Pose Estimation using Part Affinity Fields," In Proceedings of the IEEE Conference on Computer Vision and Pattern Recognition, Honolulu, HI, USA, Jul. 21-26, 2017, 9 pages.

Chen et al., "Deeplab: Semantic image segmentation with deep convolutional nets, atrous convolution, and fully connected crfs," IEEE Trans. Pattern Anal. Mach. Intell., 2018, 40:834-848.

Chen et al., "Encoder-Decoder with Atrous Separable Convolution for Semantic Image Segmentation," Proceedings of the ECCV, 2018, 18 pages.

Chen et al., "Markov Approximation for Combinatorial Network Optimization," IEEE Transactions on Information Theory 2013, 59:1-28.

Choi et al., "Individual Pig Detection Using Kinect Depth Information," Kips Trans. Comput. Commun. Syst., 2016, 5(10):319-326.

Clark et al., "An advanced, low-cost, GPS-based animal tracking system," Rangel. Ecol. Manag. 2006, 59:334-340.

Cordts et al., "The cityscapes dataset for semantic urban scene understanding," IEEE Conference on Computer Vision and Pattern Recognition, 2016, 3213-3223.

Dehghan et al., "Gmmcp tracker: Globally optimal generalized maximum multi clique problem for multiple object tracking," Proceedings of the IEEE Conference on Computer Vision and Pattern Recognition, 2015, 4091-4099.

Deng et al., "Imagenet: A large-scale hierarchical image database," Proceedings of the 2009 IEEE Conference on Computer Vision and Pattern Recognition (CVPR 2009), 2009, 248-255.

Di Stefano et al., "A simple and efficient connected components labeling algorithm," Proceedings of the 10th International Conference on Image Analysis and Processing, 1999, 7 pages.

Escalante et al., "Sow-activity classification from acceleration patterns: A machine learning approach," Comput. Electron. Agric., 2013, 93:17-26.

Everingham et al., "The pascal visual object classes challenge: A retrospective," Int. J. Comput. Vis., 2015, 111:98-136.

Feng et al., "Development and evaluation on a RFID-based traceability system for cattle/beef quality safety in China," Food Control, 2013, 31:314-325.

Fernandes et al., "A novel automated system to acquire biometric and morphological measurements, and predict body weight of pigs via 3D computer vision," J. Anim. Sci., 2018, 97:496-508.

Floyd, "RFID in animal-tracking applications," IEEE Potentials, 2015, 34:32-33.

Giancola et al., "UWB MAC and network solutions for low data rate with location and tracking applications," Proceedings of the 2005 IEEE International Conference on Ultra-Wideband,2005, 758-763.

Girshick et al., "Rich feature hierarchies for accurate object detection and semantic segmentation," Proceedings of the IEEE Conference on Computer Vision and Pattern Recognition, 2014, 580-587.

Girshick, "Fast r-cnn," Proceedings of the IEEE International Conference on Computer Vision, Santiago, 2015, 1440-1448.

Hansen et al., "Towards on-farm pig face recognition using convolutional neural networks," Computers in Industry 2018, 98:145-152.

He et al., "Deep residual learning for image recognition," Proceedings of the IEEE conference on computer vision and pattern recognition, 2016, 770-778.

He et al., "Mask r-cnn," Proceedings of the 2017 IEEE International Conference on Computer Vision (ICCV), 2017, 2980-2988.

Huang et al., "Densely connected convolutional networks," Proceedings of the CVPR, 2017, 1:3.

Iredale et al., "The influence of observer presence on baboon (*Papio* spp.) and rhesus macaque (*Macaca mulatta*) behavior," Applied animal behaviour science, 2010, 122:53-57.

Jack et al., "The effects of observer presence on the behavior of Cebus capucinus in Costa Rica," American Journal of Primatology: Official Journal of the American Society of Primatologists, 2008, 70:490-494.

Jia et al., "Caffe: Convolutional architecture for fast feature embedding," Proceedings of the 22nd ACM International Conference on Multimedia, 2014, 675-678.

Ju et al., "A Kinect-Based Segmentation of Touching-Pigs for Real-Time Monitoring," Sensors, 2018, 18:1746.

Kashiha et al., "Automatic monitoring of pig locomotion using image analysis," Livest. Sci., 2014, 159, 141-148.

Kim et al., "Animal situation tracking service using RFID, GPS, and sensors," Proceedings of the 2010 IEEE Second International Conference on Computer and Network Technology (ICCNT), 2010, 153-156.

Kim et al., "Depth-Based Detection of Standing-Pigs in Moving Noise Environments," Sensors, 2017, 17:2757.

Kirk, "NVIDIA CUDA software and GPU parallel computing architecture," Proceedings of the 6th International symposium on Memory management, 2007, 7:103-104.

Kongsro, "Estimation of pig weight using a Microsoft Kinect prototype imaging system," Comput. Electron. Agric., 2014, 109:32-35.

(56) References Cited

OTHER PUBLICATIONS

Krizhevsky et al., "Imagenet classification with deep convolutional neural networks," Proceedings of the Advances in Neural Information Processing Systems, 2012, 1097-1105.
Lao et al., "Automatic recognition of lactating sow behaviors through depth image processing," Comput. Electron. Agric., 2016, 125:56-62.
LeCun et al., "Gradient-based learning applied to document recognition," Proc. IEEE, 1998, 8:2278-2324.
Lee et al., "Automatic Recognition of Aggressive Behavior in Pigs Using a Kinect Depth Sensor," Sensors, 2016, 16:631.
Leruste et al., "Effects of the observation method (direct v. from video) and of the presence of an observer on behavioural results in veal calves," Animal, 2013, 7:1858-1864.
Lin et al., "Microsoft coco: Common objects in context," Proceedings of the European Conference on Computer Vision, 2014, 740-755.
Liu et al., "Single shot multibox detector," Proceedings of the European Conference on Computer Vision, 2016, 21-37.
Long et al., "Fully convolutional networks for semantic segmentation," Pr+A26oceedings of the IEEE Conference on Computer Vision and Pattern Recognition, 2015, 3431-3440.
Luo et al., "Multiple object tracking: A literature review," arXiv, 2014, arXiv: 1409.7618.
Luo et al., "Understanding the effective receptive field in deep convolutional neural networks," Proceedings of the 30th International Conference on Neural Information Processing Systems, 2016, 4905-4913.
Matthews et al., "Automated tracking to measure behavioural changes in pigs for health and welfare monitoring," Sci. Rep., 2017, 7:17582.
Matthews et al., "Early detection of health and welfare compromises through automated detection of behavioural changes in pigs," Vet. J., 2016, 217:43-51.
Milan et al., "MOT16: A benchmark for multi-object tracking," arXiv preprint arXiv:1603.00831 2016.
Mittek et al., "Health Monitoring of Group-Housed Pigs using Depth-Enabled Multi-Object Tracking," In Proceedings of the International Conference on Pattern Recognition, Workshop on Visual observation and analysis of Vertebrate and Insect Behavior, Cancun, Mexico, Dec. 4, 2016, 9-12.
Mittek et al., "Tracking of group-housed pigs using multi-ellipsoid expectation maximisation," IET Comput. Vis., 2017, 12:121-128.
Nasirahmadi et al., "Using machine vision for investigation of changes in pig group lying patterns," Comput. Electron. Agric., 2015, 119:184-190.
Neethirajan, "Recent advances in wearable sensors for animal health management," Sens. Bio-Sens. Res., 2017, 12:15-29.
Newell et al., "Stacked hourglass networks for human pose estimation," Proceedings of the European Conference on Computer Vision, 2016, 483-499.
Nilsson et al., "Learning based image segmentation of pigs in a pen," Proceedings of the Visual Observation and Analysis of Vertebrate and Insect Behavior, 2014, 1-4.
Otsu, "A threshold selection method from gray-level histograms," IEEE Trans. Syst. Man Cybern., 1979, 9:62-66.
Papandreou et al., "PersonLab: Person Pose Estimation and Instance Segmentation with a Bottom-Up, Part-Based, Geometric Embedding Model," In Proceedings of the European Conference on Computer Vision, Munich, Germany, Sep. 8-14, 2018, 21 pages.
Pezzuolo et al., "On-barn pig weight estimation based on body measurements by a Kinect v1 depth camera," Comput. Electron. Agric. 2018, 148:29-36.
Porto et al., "Localisation and identification performances of a real-time location system based on ultra wide band technology for monitoring and tracking dairy cow behaviour in a semi-open free-stall barn," Comput. Electron. Agric., 2014, 108:221-229.
Psota et al., "Multi-Pig Part Detection and Association with a Fully-Convolutional Network," Sensors, 2019, 19.
Redmon et al., "YOLO9000: Better, Faster, Stronger," Proceedings of the IEEE Conference on Computer Vision and Pattern Recognition, 2017, 7263-7271.
Redmon et al., "You only look once: Unified, real-time object detection," Proceedings of the IEEE Conference on Computer Vision and Pattern Recognition, 2016, 779-788.
Ren et al., "Faster r-cnn: Towards real-time object detection with region proposal networks," Proceedings of the 28th International Conference on Neural Information Processing Systems, 2015, 91-99.
Ristani et al., "Features for multi-target multi-camera tracking and re-identification," Proceedings of the IEEE conference on computer vision and pattern recognition, 2018, 6036-6046.
Ronneberger et al., "U-net: Convolutional networks for biomedical image segmentation," Proceedings of the International Conference on Medical Image Computing and Computer-Assisted Intervention, 2015, 234-241.
Ruiz-Garcia et al., "A Review of Wireless Sensor Technologies and Applications in Agriculture and Food Industry: State of the Art and Current Trends," Sensors, 2009, 9:4728-4750.
Schleppe et al., "Challenges in the design of a GNSS ear tag for feedlot cattle," Comput. Electron. Agric., 2010, 70:84-95.
Schwager et al., "Robust classification of animal tracking data," Comput. Electron. Agric., 2007, 56:46-59.
Stavrakakis et al., "Validity of the Microsoft Kinect sensor for assessment of normal walking patterns in pigs," Comput. Electron. Agric., 2015, 117:1-7.
Stukenborg et al., "Agonistic behaviour after mixing in pigs under commercial farm conditions," Appl. Anim. Behav. Sci., 2011, 129:28-35.
Taylor, "Cattle health monitoring using wireless sensor networks," In Proceedings of the Communication and Computer Networks Conference, 2004, 8 pages.
Tullo et al., "Precision livestock farming: An overview of image and sound labelling," In European Conference on Precision Livestock Farming 2013:(PLF) EC-PLF; KU Leuven: Leuven, Belgium, 2013, 30-38.
Tuyttens et al., "Observer bias in animal behaviour research: can we believe what we score, if we score what we believe?" Anim. Behav., 2014, 90:273-280.
Voulodimos et al., "A complete farm management system based on animal identification using RFID technology," Comput. Electron. Agric. 2010, 70:380-388.
Wathes et al., "Is precision livestock farming an engineer's daydream or nightmare, an animal's friend or foe, and a farmer's panacea or pitfail?" Comput. Electron. Agric., 2008, 64:2-10.
Wedin et al., "Early indicators of tail biting outbreaks in pigs," Appl. Anim. Behav. Sci., 2018, 208:7-13.
Zhang et al., "Automatic individual pig detection and tracking in pig farms," Sensors, 2019, 19:1188.
Zhang, "Microsoft kinect sensor and its effect," IEEE multimedia 2012, 19:4-10.
Zhong et al., "Re-ranking person re-identification with k-reciprocal encoding," Proceedings of the IEEE Conference on Computer Vision and Pattern Recognition, 2017, 1318-1327.
Zhu et al., "Automatic Animal Detection from Kinect Sensed Images for Livestock Monitoring and Assessment," In Proceedings of the 2015 IEEE International Conference on Computer and Information Technology, Ubiquitous Computing and Communications, Dependable, Autonomic and Secure Computing, Pervasive Intelligence and Computing, Liverpool, UK, Oct. 26-28, 2015, 1154-1157.

\* cited by examiner

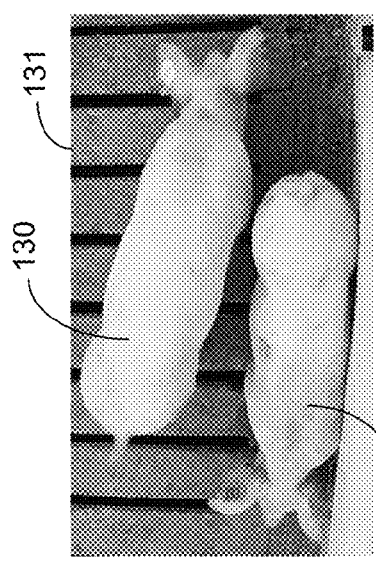
FIG. 1A Input image
FIG. 1B Target mapping
FIG. 1C Visualization
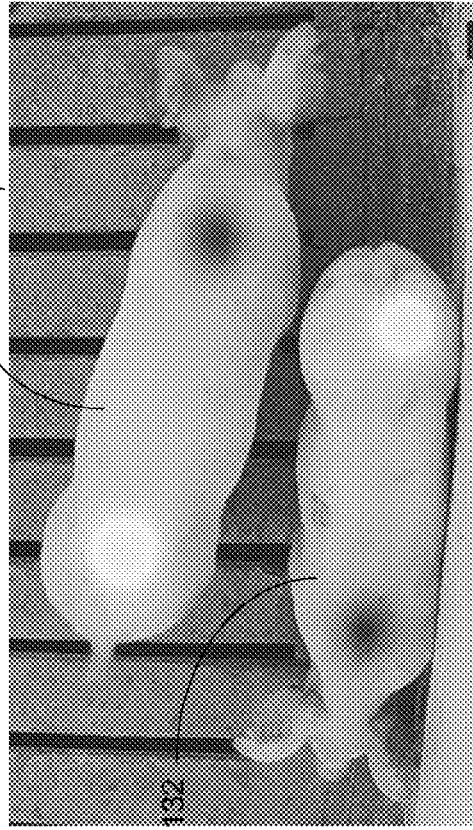
FIG. 2A Image with part detections
FIG. 2B Optimal grouping using Euclidean distance Input image Target mapping Visualization 2D vector → color Table 2

| Channel | 5 | 6 | 7 | 8 | 9 | 10 |
|---|---|---|---|---|---|---|
| Encoding | $\propto (x_{l_n} - x_{s_n})$ | $\propto (y_{l_n} - y_{s_n})$ | $\propto (x_{s_n} - x_{l_n})$ | $\propto (y_{s_n} - y_{l_n})$ | $\propto (x_{r_n} - x_{s_n})$ | $\propto (y_{r_n} - y_{s_n})$ |
| Channel | 11 | 12 | 13 | 14 | 15 | 16 |
| Encoding | $\propto (x_{s_n} - x_{t_n})$ | $\propto (y_{s_n} - y_{r_n})$ | $\propto (x_{s_n} - x_{t_n})$ | $\propto (y_{s_n} - y_{t_n})$ | $\propto (x_{t_n} - x_{s_n})$ | $\propto (y_{t_n} - y_{s_n})$ |

FIG. 15

Table 3

| Layer Type | I | C | C | M | C | ... | C | M | U | C | ... | C | U | D | C | O |
|---|---|---|---|---|---|---|---|---|---|---|---|---|---|---|---|---|
| $l$ | 1 | 2 | 3 | 4 | 5 | ... | 18 | 19 | 20 | 21 | ... | 37 | 38 | 39 | 40 | 41 |
| $s_l$ | 1 | 1 | 1 | 2 | 1 | ... | 1 | 2 | 0.5 | 1 | ... | 1 | 0.5 | 1 | 1 | 1 |
| $s_{l_{effective}}$ | 1 | 1 | 1 | 2 | 2 | ... | 16 | 32 | 16 | 16 | ... | 2 | 1 | 1 | 1 | 1 |
| $w_l$ | 1 | 3 | 3 | 1 | 3 | ... | 3 | 1 | 1 | 3 | ... | 3 | 1 | 1 | 3 | 3 |
| $r_l$ | 1 | 3 | 5 | 5 | 9 | ... | 181 | 181 | 181 | 213 | ... | 359 | 359 | 359 | 361 | 363 |

FIG. 16

Table 4

| Part Detection Threshold | Vector Matching | | | | | | Euclidean Matching | | | | | |
|---|---|---|---|---|---|---|---|---|---|---|---|---|
| | TP | FP | FN | Recall | Precision | F-Measure | TP | FP | FN | Recall | Precision | F-Measure |
| 0.10 | 20,217 | 27 | 525 | 0.975 | 0.999 | 0.987 | 19,170 | 1181 | 1572 | 0.924 | 0.942 | 0.933 |
| 0.15 | 20,160 | 20 | 582 | 0.972 | 0.999 | 0.985 | 19,127 | 1156 | 1615 | 0.922 | 0.943 | 0.932 |
| 0.20 | 20,092 | 17 | 650 | 0.969 | 0.999 | 0.984 | 19,058 | 1154 | 1684 | 0.919 | 0.943 | 0.931 |
| 0.25 | 19,999 | 13 | 743 | 0.964 | 0.999 | 0.981 | 18,971 | 1141 | 1771 | 0.915 | 0.943 | 0.929 |
| 0.30 | 19,865 | 10 | 877 | 0.958 | 0.999 | 0.978 | 18,851 | 1135 | 1891 | 0.909 | 0.943 | 0.926 |
| 0.35 | 19,675 | 7 | 1067 | 0.949 | 1.000 | 0.973 | 18,675 | 1162 | 2067 | 0.900 | 0.941 | 0.920 |
| 0.40 | 19,413 | 3 | 1329 | 0.936 | 1.000 | 0.967 | 18,418 | 1190 | 2324 | 0.888 | 0.939 | 0.913 |
| 0.45 | 19,029 | 2 | 1713 | 0.917 | 1.000 | 0.957 | 18,077 | 1195 | 2665 | 0.872 | 0.938 | 0.904 |
| 0.50 | 18,408 | 2 | 2334 | 0.887 | 1.000 | 0.940 | 17,526 | 1269 | 3216 | 0.845 | 0.932 | 0.887 |
| 0.55 | 17,287 | 2 | 3455 | 0.833 | 1.000 | 0.909 | 16,568 | 1281 | 4174 | 0.799 | 0.928 | 0.859 |
| 0.60 | 15,227 | 2 | 5515 | 0.734 | 1.000 | 0.847 | 14,871 | 1294 | 5871 | 0.717 | 0.920 | 0.806 |
| 0.65 | 11,929 | 0 | 8813 | 0.575 | 1.000 | 0.730 | 12,184 | 1189 | 8558 | 0.587 | 0.911 | 0.714 |
| 0.70 | 7565 | 0 | 13,177 | 0.365 | 1.000 | 0.534 | 8543 | 860 | 12,199 | 0.412 | 0.909 | 0.567 |
| 0.75 | 3261 | 0 | 17,481 | 0.157 | 1.000 | 0.272 | 4523 | 430 | 16,219 | 0.218 | 0.913 | 0.352 |
| 0.80 | 692 | 0 | 20,050 | 0.033 | 1.000 | 0.065 | 1414 | 90 | 19,328 | 0.068 | 0.940 | 0.127 |
| 0.85 | 53 | 0 | 20,689 | 0.003 | 1.000 | 0.005 | 143 | 3 | 20,599 | 0.007 | 0.979 | 0.014 |
| 0.90 | 1 | 0 | 20,741 | 0.000 | 1.000 | 0.000 | 5 | 0 | 20,737 | 0.000 | 1.000 | 0.000 |

FIG. 17

ANIMAL DETECTION BASED ON DETECTION AND ASSOCIATION OF PARTS

CROSS-REFERENCE TO RELATED APPLICATIONS

This application claims priority to U.S. provisional application 62/867,626, filed on Jun. 27, 2019, and U.S. provisional application 63/040,951, filed on Jun. 18, 2020. The entire contents of the above applications are incorporated by reference.

TECHNICAL FIELD

This disclosure relates to animal detection based on detection and association of parts.

BACKGROUND

Changes in animal behavior may correlate with changes in health. Conventional labor-intensive methods used to monitor behaviors of animals may not be feasible for modern commercial swine facilities in which, in some examples, only a few seconds of daily observation is given per pig. Because industry caretakers in some examples may be responsible for thousands of pigs, it is difficult for them to thoroughly assess the health and well-being of individual pigs using manual observation. Further, the effectiveness of human visual assessments is limited by both the attention span and subjectivity of observers.

SUMMARY

In a general aspect, a computer-implemented method of recognizing animals is provided. The method includes recognizing, by using at least one computer, a plurality of body parts of a plurality of animals based on at least one image of the animals, in which the plurality of body parts include a plurality of types of body parts, including determining first estimated positions of the recognized body parts in the at least one image. The method includes estimating, by using the at least one computer, a plurality of first associations of body parts based on the at least one image of the animals, each first association of body parts associates a body part of an animal with at least one other body part of the same animal, including determining relative positions of the body parts in each estimated first association of body parts in the at least one image. The method includes determining, based on the first estimated positions of the recognized body parts and the relative positions of the body parts in the recognized first associations of body parts, second associations of body parts in which each second association of body parts associates a recognized body part of an animal with at least one other recognized body part of the same animal; and recognizing individual animals in the at least one image based on the second associations of body parts of the animals.

Implementations of the method can include one or more of the following features. The method can include processing the at least one image to generate an output that includes a plurality of channels of data, in which each channel of a first subset of the plurality of channels has information about probability values of possible locations of a particular type of body part of the animals in the at least one image, and processing the channels of data to determine the first estimated positions of the recognized body parts in the at least one image.

The method can include adapting the recognition of the body parts to animals of varying sizes by applying a Gaussian kernel defined by a larger standard deviation for processing body parts of larger animals in the at least one image of the animals, and applying a Gaussian kernel defined by a smaller standard deviation for processing body parts of smaller animals in the at least one image of the animals.

The method can include determining the second associations of body parts by applying a Hungarian assignment algorithm to an association distance matrix to minimize a sum of association distances of a plurality of pairs of body parts.

Recognizing a plurality of body parts can include using at least one neural network to recognize shoulder portions, tail portions, left ears, and right ears of the animals based on the at least one image of the animals.

Determining first estimated positions of the body parts can include determining first estimated positions of the recognized shoulder portions, first estimated positions of the recognized tail portions, first estimated positions of the recognized left ears, and first estimated positions of the recognized right ears of the animals.

Determining the first estimated positions can include determining the first estimated positions based on regional max response detection.

Determining the first estimated positions based on regional max response detection can include determining:

$$\{p\} = \{(x,y) | M_p(x,y) \geq M_p(x',y') \text{ for all } (x',y') \in \mathcal{R}_{(x,y)}\}$$
$$\text{for } p \in \{l,r,s,t\}$$

wherein $M_p$ represents an image space map for body part $p \in \{l, r, s, t\}$ represents left ear, r represents right ear, s represents shoulder portion, t represents tail portion, $R_{(x,y)}$ represents a region surrounding image space location (x,y), the first estimated positions are represented by $$\{p_1, \ldots, p_{N_p}\} = \{(x_{p1}, y_{p1}), \ldots, (x_{pN_p}, y_{pN_p})\} \text{ for } p \in \{l,r,s,t\}$$

and $N_p$ represents the number of body parts for body part p.

Recognizing the plurality of first associations of body parts can include using the at least one neural network to recognize first associations of shoulder portions and tail portions, first associations of shoulder portions and left ears, and first associations of shoulder portions and right ears of the animals.

Determining the second associations of body parts can include, for at least a subset of the recognized shoulder portions, associating each recognized shoulder portion with a recognized tail portion, associating each recognized shoulder portion with a recognized left ear, and associating each recognized shoulder portion with a recognized right ear. The second associations can be determined in a way to reduce an overall difference between the first estimated positions of the body parts and second estimated positions of body parts that are determined based on the relative positions of the body parts in the recognized first association of body parts.

The first estimated positions can be represented by $$\{p_1, \ldots, p_{N_p}\} = \{(x_{p1}, y_{p1}), \ldots, (x_{pN_p}, y_{pN_p})\} \text{ for } p \in \{l, r, s, t\}$$

wherein l represents left ear, r represents right ear, s represents shoulder portion, t represents tail portion, $N_p$ represents the number of body parts for body part p, the first associations of body parts can be represented by an association mapping:

$$[M_{l \to s}^x M_{l \to s}^y M_{s \to l}^x M_{s \to l}^y M_{r \to s}^x M_{r \to s}^y M_{s \to r}^x M_{s \to r}^y$$
$$M_{s \to t}^x M_{s \to t}^y M_{t \to s}^x M_{t \to s}^y],$$

wherein l represents left ear, r represents right ear, s represents shoulder portion, t represents tail portion, $M_{l \to s}^x$ represents an image space mapping from left ears to shoulders in the x direction, $M_{l \to s}^y$ represents an image space mapping from left ears to shoulders in the y direction, $M_{s \to l}^x$ represents an image space mapping from shoulders to left ears in the x direction, $M_{s \to l}^y$ represents an image space mapping from shoulders to left ears in the y direction, $M_{r \to s}^x$ represents an image space mapping from right ears to shoulders in the x direction, $M_{r \to s}^y$ represents an image space mapping from right ears to shoulders in the y direction, $M_{s \to r}^x$ represents an image space mapping from shoulders to right ears in the x direction, $M_{s \to r}^y$ represents an image space mapping from shoulders to right ears in the y direction, $M_{s \to t}^x$ represents an image space mapping from shoulders to tails in the x direction, $M_{s \to t}^y$ represents an image space mapping from shoulders to tails in the y direction, $M_{t \to s}^x$ represents an image space mapping from tails to shoulders in the x direction, and $M_{t \to s}^y$ represents an image space mapping from tails to shoulders in the y direction, an estimated location of an associated body part q from location $p_n$ can be represented by:

$$(p \to q)_n = (x_{p_n} - M_{p \to q}^x(x_{p_n}, y_{p_n}), y_{p_n} - M_{p \to q}^y(x_{p_n}, y_{p_n})) \text{ for all } n=1, \ldots, N_p,$$

an association distance between body parts $p_n$ and $q_m$ can be represented by $$d(p_n, q_m) = \frac{|(p \to q)_n - q_m| + |(q \to p)_m - p_n|}{2},$$

wherein |a| denotes an L2-norm of vector a, association distances of the body parts can form three distance matrices that are represented by:

$$D_{p,q} = \begin{bmatrix} d(p_1, q_1) & d(p_1, q_2) & \ldots & d(p_1, q_{N_q}) \\ d(p_2, q_1) & d(p_2, q_2) & \ldots & d(p_2, q_{N_q}) \\ \vdots & \vdots & \ddots & \vdots \\ d(p_{N_p}, q_1) & d(p_{N_p}, q_2) & \ldots & d(p_{N_p}, q_{N_q}) \end{bmatrix},$$

wherein (p=l, q=s) for the first distance matrix, (p=r, q=s) for the second distance matrix, and (p=s, q=t) for the third distance matrix. The second associations of body parts can be determined in a way so as to minimize a sum of the association distances.

The second associations of body parts can be determined by applying a Hungarian assignment algorithm to each distance matrix to minimize the sum of the association distances.

The method can include tracking positions of the individual animals over time by tracking positions of pairs of recognized shoulder portions and recognized tail portions of the individual animals.

The animals can include at least one of pigs, cows, horses, sheep, lambs, llamas, alpacas, dogs, or cats.

The one or more images can include one or more images of animals in an enclosed environment, and the one or more images are captured by at least one camera positioned above the animals.

In another general aspect, a computer-implemented method of recognizing animals is provided. The method includes applying at least one recognition module to at least one image of animals to recognize body parts of the animals, in which the body parts include a plurality of types of body parts, and the at least one recognition module outputs first estimated positions of the recognized body parts in the at least one image. The method includes applying the at least one recognition module to the at least one image of animals to recognize first associations of body parts of the animals, in which each first association of body parts associates a body part of an animal with at least one other body part of the same animal, and the at least one recognition module outputs relative positions of the body parts in each recognized first association of body parts. The method includes determining, based on the first estimated positions of the recognized body parts and the relative positions of the body parts in the recognized first associations of body parts, second associations of body parts in which each second association of body parts associates a recognized body part of an animal with at least one other recognized body part of the same animal; and recognizing individual animals in the at least one image based on the second associations of body parts of the animals.

In another general aspect, a computer-implemented method of recognizing pigs is provided. The method includes: applying at least one recognition module to at least one image of animals to recognize individual body parts of the animals, wherein the at least one recognition module outputs first estimated locations of the recognized individual body parts in the at least one image. The method includes applying the at least one recognition module to the at least one image of animals to recognize groups of body parts of the animals, wherein the at least one recognition module outputs relative positions of the body parts in each recognized group of body parts. The method includes determining associations of recognized individual body parts based on (i) the first estimated locations of the recognized individual body parts of the animals and (ii) the relative positions of the body parts in the recognized groups of body parts, and recognizing individual animals in the at least one image based on the associations of recognized individual body parts of the animals.

In another general aspect, a computer-implemented method of recognizing pigs is provided. The method includes applying at least one recognition module to at least one image of pigs to recognize body parts of the pigs, in which the body parts include shoulder portions, tail portions, left ears, and right ears of the pigs, wherein the at least one recognition module outputs estimated locations of the recognized shoulder portions, the recognized tail portions, the recognized left ears, and the recognized right ears in the at least one image. The method includes applying the at least one recognition module to the at least one image of pigs to estimate relative positions of pairs of body parts of the pigs, including estimating a position of a shoulder portion relative to a corresponding tail portion for each of a plurality of estimated tail portions in the image, estimating a position of a shoulder portion relative to a corresponding left ear portion for each of a plurality of estimated left ear portions in the image, and estimating a position of a shoulder portion relative to a corresponding right ear portion for each of a plurality of estimated right ear portions in the image. The method includes determining, for each of at least some of the recognized shoulder portions, an association with a recognized tail portion, a recognized left ear, and a recognized right ear of the same pig based on (i) the estimated positions of the recognized shoulder portions, tail portions, left ears and right rears, and (ii) the estimated relative positions of the shoulder portions and corresponding tail portions, the estimated relative positions of the shoulder portions and corresponding left ear portions, and the estimated relative positions of the shoulder portions and corresponding right ear portions; and recognizing individual pigs in the at least one image of pigs based on the associations of recognized shoulder portions with recognized tail portions.

In another general aspect, a system for recognizing animals includes: at least one data processor; and at least one storage device storing instructions that when executed by the at least one data processor, performs a process that includes recognizing a plurality of body parts of the plurality of animals based on at least one image of the animals, in which the plurality of body parts include a plurality of types of body parts, including determining first estimated positions of the recognized body parts in the at least one image. The process includes recognizing a plurality of first associations of body parts based on the at least one image of the animals, each first association of body parts associates a body part of an animal with at least one other body part of the same animal, including determining relative positions of the body parts in each recognized first association of body parts in the at least one image. The process includes determining, based on the first estimated positions of the recognized body parts and the relative positions of the body parts in the recognized first associations of body parts, second associations of body parts in which each second association of body parts associates a recognized body part of an animal with at least one other recognized body part of the same animal; and recognizing individual animals in the at least one image based on the second associations of body parts of the animals.

Implementations of the system can include the following features. The system can further include at least one image capturing device for obtaining the at least one image of the animals.

In another general aspect, a system for recognizing animals includes: at least one body-part recognition module that is configured to recognize body parts of animals in at least one image of the animals, in which the body parts include a plurality of types of body parts, and the at least one recognition module outputs first estimated positions of the recognized body parts in the at least one image. The at least one body-part recognition module is further configured to recognize first associations of body parts of the animals, in which each first association of body parts associates a body part of an animal with at least one other body part of the same animal, and the at least one recognition module outputs relative positions of the body parts in each recognized first association of body parts. The system includes an association module configured to determine, based on the first estimated positions of the recognized body parts and the relative positions of the body parts in the recognized first associations of body parts, second associations of body parts in which each second association of body parts associates a recognized body part of an animal with at least one other recognized body part of the same animal; and an animal recognition module configured to recognize individual animals in the at least one image based on the second associations of body parts of the animals.

In another general aspect, a system for recognizing animals includes: at least one body-part recognition module configured to process at least one image of animals to recognize individual body parts of the animals, wherein the at least one body-part recognition module outputs first estimated locations of the recognized individual body parts in the at least one image. The at least one body-part recognition module is further configured to process the at least one image of animals to recognize groups of body parts of the animals, wherein the at least one body-part recognition module outputs relative positions of the body parts in each recognized group of body parts. The system includes an association module configured to associate each of at least some of the recognized individual body parts with at least one other recognized individual body part of the same animal based on (i) the first estimated locations of the recognized individual body parts of the animals and (ii) the relative positions of the body parts in the recognized groups of body parts, and an animal recognition module configured to recognize individual animals in the at least one image based on the associations of recognized individual body parts of the animals.

In another general aspect, a system for recognizing pigs includes: at least one pig-part recognition module configured to process at least one image of pigs to recognize body parts of the pigs, in which the body parts include shoulder portions, tail portions, left ears, and right ears of the pigs, wherein the at least one body-part recognition module is configured to output first estimated locations of the recognized shoulder portions, the recognized tail portions, the recognized left ears, and the recognized right ears in the at least one image of pigs. The at least one pig-part recognition module is further configured to process the at least one image of pigs to recognize pairs of body parts of the pigs, including recognizing a pair of shoulder portion and tail portion of each of at least some of the pigs, recognizing a pair of shoulder portion and left ear of each of at least some of the pigs, and recognizing a pair of shoulder portion and right ear of each of at least some of the pigs. The at least one pig-part recognition module is configured to output a position of the tail portion relative to the corresponding shoulder portion in each recognized pair of shoulder portion and tail portion, a position of the left ear relative to the corresponding shoulder portion in each recognized pair of shoulder portion and left ear, and a position of the right ear relative to the corresponding shoulder portion in each recognized pair of shoulder portion and right ear. The system includes a pig-part association module configured to determine, for each of at least some of the recognized shoulder portions, an association with a recognized tail portion, a recognized left ear, and a recognized right ear of the same pig based on (i) the first estimated positions of the recognized shoulder portions, tail portions, left ears and right rears, and (ii) the relative positions of the tail portion and the corresponding shoulder portion in each recognized pair of shoulder portion and tail portion, the relative positions of the left ear and the corresponding shoulder portion in each recognized pair of shoulder portion and left ear, and the relative position of the right ear and the corresponding shoulder portion in each recognized pair of shoulder portion and right ear; and a pig-recognition module configured to recognize individual pigs in the at least one image of pigs based on the associations of recognized shoulder portions with recognized tail portions.

In another general aspect, a machine-readable medium is provided, in which the medium stores instructions that when executed by a machine cause the machine to perform a process that includes recognizing a plurality of body parts of a plurality of animals based on at least one image of the animals, in which the plurality of body parts include a plurality of types of body parts, including determining first estimated positions of the recognized body parts in the at least one image. The process includes recognizing a plurality of first associations of body parts based on the at least one image of the animals, each first association of body parts associates a body part of an animal with at least one other body part of the same animal, including determining relative positions of the body parts in each recognized first association of body parts in the at least one image. The process includes determining, based on the first estimated positions of the recognized body parts and the relative positions of the body parts in the recognized first associations of body parts, second associations of body parts in which each second association of body parts associates a recognized body part of an animal with at least one other recognized body part of the same animal; and recognizing individual animals in the at least one image based on the second associations of body parts of the animals.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

The disclosure is best understood from the following detailed description when read in conjunction with the accompanying drawings.

FIG. 1A is an example input image depicting two pigs.

FIG. 1B shows an example target mapping in which the locations of left ear, right ear, shoulder, and tail parts are represented by red, green, blue, and yellow spots, respectively.

FIG. 1C shows an example superimposed visualization that shows the locations of the four parts in reference to the original image.

FIG. 2A shows an example image of two nearby pigs with body parts annotated.

FIG. 2B shows an example diagram indicating that an optimal Euclidean nearest-neighbor part association is prone to failure when the animals are in close proximity.

FIG. 15 shows an example table of channel numbers and the corresponding data they encode.

FIG. 16 shows an example table of receptive field calculations at the output of every layer of the network shown in FIG. 5.

FIG. 17 shows a table of example results obtained for both the animal detection method and an alternative association strategy that assigns parts to one another by minimizing Euclidean distance.

Like reference numbers and designations in the various drawings indicate like elements.

DETAILED DESCRIPTION

Figure 3A:
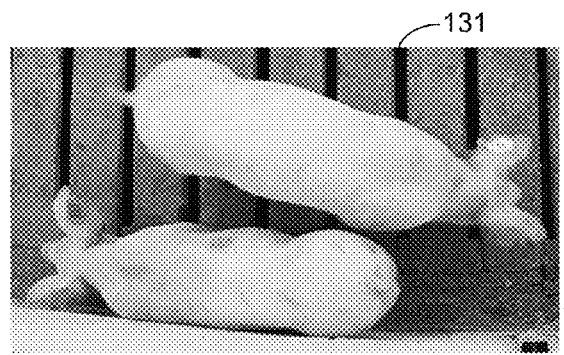
FIG. 3A is an example input image.

This disclosure provides a generalizable vision-based solution for animal detection in group-housing environments. Although conventional animal tracking methods using radio identification devices directly provide data on individual animals, there are several disadvantages to using wearable methods when compared to video-based approaches. For example, wearables need to withstand harsh environments, they require costly installation and maintenance on a per animal basis, and the localization accuracy of both ultra-wide band (UWB) and global positioning system (GPS) systems may be too low to detect animal orientation, activities, and social behaviors. By comparison, video can provide information-rich data that allow humans to identify precisely what each animal is doing at all times. This disclosure provides a method for converting digital video to meaningful data without (or with little) human intervention.

In a general aspect, this disclosure describes computer vision systems that can provide automated, non-invasive monitoring of livestock animals. This disclosure introduces a new dataset and a new animal detection method for instance-level detection of multiple pigs in group-housed environments. In some implementations, the animal detection method uses a single fully-convolutional neural network to detect the location and orientation of each animal, where both body part locations and pairwise associations are represented in the image space. Also disclosed is a new dataset containing 2000 annotated images with 24,842 individually annotated pigs from 17 different locations. The animal detection method described here achieves over 99% precision and over 96% recall when detecting pigs in environments previously seen by the network during training. To evaluate the robustness of the trained network, it is also tested on environments and lighting conditions unseen in the training set, where it achieves 91% precision and 67% recall.

A deep convolutional neural network can be used for applications such as image classification, image segmentation, object detection, and object tracking. This disclosure introduces a fully convolutional neural network used to identify the location and orientation of multiple group-housed pigs. The target output of the network is an image-space representation of each pig's body part locations and association vectors between body parts. The outputs of the network can be used in a method for associating each pig's body parts to form complete instances. To train the network, a new dataset is used that contains 2000 images with 24,842 uniquely labeled pig instances. The dataset is divided into a training set and a testing set, and the testing set is subdivided into two sets: one with images depicting the same environments as the training set (sometimes referred to herein as the "test:seen" set), and another with images of new environments not represented in the training set (sometimes referred to herein as the "test:unseen" set). This dataset design allows the robustness of detection algorithms to be tested against novel animal presentations and environments. Important aspects of this disclosure include: (1) a fully convolutional instance detection method, (2) a public dataset for training and evaluation, and (3) metrics that can be used to measure the performance of methods that detect both location and orientation.

Visual detection of multiple moving targets using a static camera can begin with segmentation of foreground objects using background subtraction. If sufficient separation between targets exists, traditional computer vision methods such as connected components can be used to easily identify unique instances. However, this is hardly the case for group-housed animals that constantly engage each other socially and often prefer to lie in groups to preserve warmth.

With the introduction of region-based convolutional neural networks or Regions with CNN features (R-CNN), visual detection methods can use deep convolutional neural networks, which generally fall into one of two categories: (1) top-down approaches that define regions of interest before performing subsequent segmentation or keypoint annotation, and (2) bottom-up approaches that directly segment pixels or detect keypoints without explicitly detecting regions of interest. Mask R-CNN, for example, uses a top-down approach for performing instance-level object segmentation and keypoint detection. Because it relies on a priori region proposal, it is inherently unable to separate objects with significant bounding box overlap, which is a common occurrence among group-housed animals. By comparison, bottom-up detection and classification is directly performed per-pixel in the image space.

This disclosure introduces a new bottom-up strategy that identifies multiple pig instances in images as a collection of keypoints (e.g., body part locations). This animal detection method preserves the association between keypoints and instances, making it possible to evaluate the performance of the method directly as a keypoint detection method. Furthermore, keypoints provide a precise representation of the pose of each animal, making it possible to identify activities and interactions between animals.

This disclosure provides a method for detecting the location and orientation of all, or nearly all, visible pigs in the pen environment. The first stage of the process aims to find the location of pertinent body parts, while the second stage aims to associate them with one another to form whole instances. The following describes a method used to represent parts and associations within the image space. This disclosure introduces a fully-convolutional network that takes, as input, an image of the pen environment and attempts to produce the image space representations. An animal detection method is provided for interpreting these image space representations and producing a set of unique animal instances.

Figure 20:
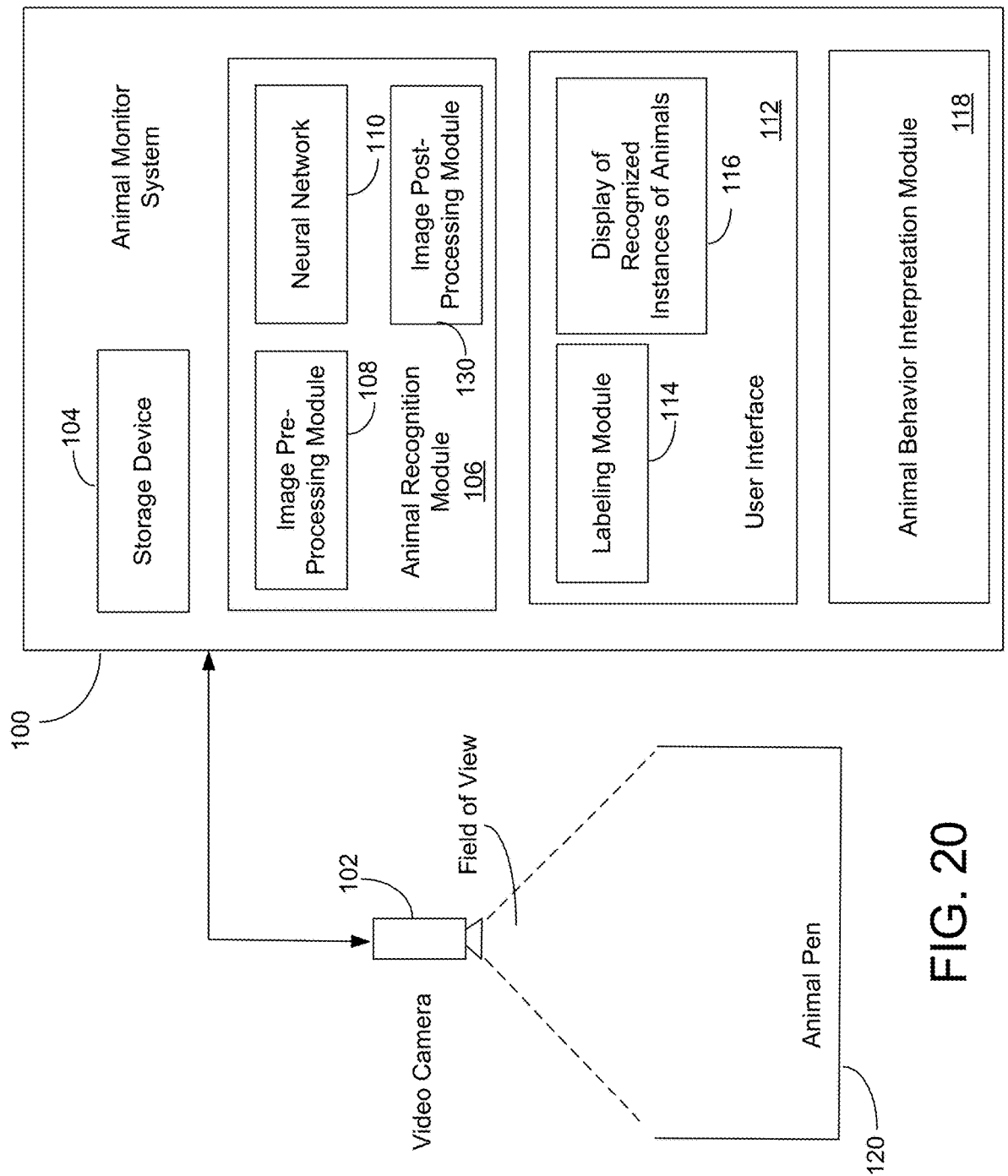
FIG. 20 is a block diagram of an example of an animal monitor system.

Referring to FIG. 20, in some implementations, an animal monitor system 100 receives images (e.g., a video having image frames) from an image capture device 102, e.g., a video camera that is mounted above a pen 120 that houses animals, such as pigs or cows. The image capture device 102 has a field of view that spans the entire pen so that all the animals in the pen are included in the images. In some cases, the field of view can span beyond the perimeter of the pen 120. The animal monitor system 100 includes a storage device 104, e.g., a hard drive that stores the received images, program code for processing the images according to the processes described below, and relevant data. An animal recognition module 106 is provided for recognizing the animals in the images. For example, the animal recognition module 106 can include an image pre-processing module 108, a neural network 110, and an image post-processing module 130 that are used to recognize the animals in the images. The image pre-processing module 108 processes the images from the image capture device 102 and outputs images in a format that is suitable for the neural network 100. For example, the image pre-processing module 108 can downsample or upsample the images so that the images have a resolution that is appropriate for the neural network 110. The neural network 110 processes the output of the image pre-processing module 108 and generates a target output such as a 16-channel image representation according to the processes described below. An image post-processing module 130, receives the output of the neural network 110 and performs post-processing of the output to recognize animal instances and locations, according to the processes below (e.g., as described in relation to FIG. 4).

A user interface 112 is provided for interacting with a user of the system 100. The user interface 112 can include a labeling module 114 that enables the user to label training images that are used to train the neural network 110. A display of recognized instances of animals 116 provides a visual representation of recognized animals, such as the image shown in FIG. 18. An animal behavior interpretation module 118 interprets the behavior of the animals based on information derived from the data representing the recognized animals. For example, the animal behavior interpretation module 118 tracks the movements of the individual recognized animal and determines whether the animal is active and healthy, or lethargic and possibly sick. The following describes the algorithms used by the animal monitor system 100 for processing the images in order to recognize the animals.

Representation of Body Part Location

This disclosure describes a method for recognizing pigs in a pen, with the assumption that images of the pen environment are captured from a downward-facing camera mounted above the pen. When trying to detect and differentiate multiple animals in a group-housed setting, a top-down view has three distinct advantages over alternative visual perspectives. Firstly, animals are generally non-occluded from the top-down perspective unless they are crawling over (or lying on top of) one another. Secondly, the size and appearance of animals is consistent from a top-down perspective, making it easier for a system to identify the animals. Thirdly, one can reliably approximate the 3D position of each animal from its projection onto the 2D image plane by assuming a constant height above the pen floor plane. Approximation is often used if 3D coordinates are desired and the single-camera system being used lacks the ability to measure depth.

From a top-down perspective, the part of the animal most likely to be visible is the surface of the back. Thus, in order to represent both the position and orientation of each pig, the disclosed method uses the image-space location of the tail and shoulder belonging to each animal. Assuming there are N animals in the pen, the tail and shoulder position of animal $n \in \{1, \ldots, N\}$ is denoted $t_n = (x_{t_n}, y_{t_n})$ and $s_n = (x_{s_n}, y_{s_n})$, respectively. In some implementations, "tail" refers to a surface point along the center ridge of the back that is between the left and right ham. The term "shoulder" refers to a surface point along the center ridge of the back between the shoulder blades. The chosen representation also includes the 2D position of the left and right ears, denoted $l_n = (x_{l_n}, y_{l_n})$ and $r_n = (x_{r_n}, y_{r_n})$, respectively. While their visibility is not guaranteed, such as when the animal lies on its side or positions its head in a feeder, their locations can be used to approximate the pose of the head and/or assign animals with a unique visual marker in the form of an ear tag.

FIG. 1A illustrates an example of an input image 131 depicting two pigs 130, 132. FIG. 1B is a graph 133 that shows target mapping in which the locations of the left ear, right ear, shoulder, and tail are represented by red spots 134, green spots 136, blue spots 138, and yellow spots 140 in the target mapping, respectively. FIG. 1C is an image 141 that provides superimposed visualization that illustrates the locations of the four parts in reference to the original image. Note that the target mapping in FIG. 1B has the same spatial dimensions (rows and columns) as the input image, but it contains four channels with each corresponding to a single body part type.

The original image in FIG. 1A can be mapped to a four-channel output as shown in FIG. 1B, in which the location of the left ear, right ear, shoulder, and tail are represented by Gaussian kernels in channels 1-4 of the output, respectively. Note that the four colors used in FIG. 1B are mostly for visualization of the four separate channels of the target image. The overlay in FIG. 1C is provided to illustrate the locations of the colored spots relative to the original image.

To approximate the level of uncertainty inherent in the user annotations of each body part location, parts within the target mapping are each represented by 2D Gaussian kernels. While the distribution of the 2D Gaussian kernels is defined by a 2×2 covariance matrix, in this example we only consider symmetric 2D Gaussian kernels that can be characterized by a single standard deviation multiplied by a 2×2 identity matrix. This standard deviation will be denoted $\sigma_n$ for each animal $n \in \{1, \ldots, N\}$. In some examples, defining a standard deviation for each animal has the advantage of accounting for variation in size between animals. This mapping of uncertainty approximates the probability distribution of part locations annotated by a human given the original image I. The kernels are scaled so that the magnitude at the center is 1.0. This allows for a straightforward translation between kernels and 2D image coordinates via a simple thresholding operation. The first four channels of a target output (e.g., the target output of a neural network), as defined in Table 1 below, are proportional to the probability that parts {l, r, s, t} exist at each spatial location in the image. For example, referring to FIG. 1B, the intensity of the red, green, blue, and yellow pixels is proportional to the probability that parts {l, r, s, t} respectively exist at that pixel.

In Table 1, channels 1-4 each correspond to a different body part. The locations of each part are marked with Gaussian kernels meant to represent the distribution of part locations provided by a human annotator. In some cases, channels 1-4 can be part of an image-space representation used to represent pig locations and orientations (e.g., a 16-channel image-space representation), further described below.

TABLE 1

| | Channel | | | |
|---|---|---|---|---|
| | 1 | 2 | 3 | 4 |
| Encoding | $\propto P(l\|I)$ | $\propto P(r\|I)$ | $\propto P(s\|I)$ | $\propto P(t\|I)$ |

Representation of Body Part Association

Even if every body part location is detected correctly, parts must be associated with each other in order to identify individual whole-animal instances. A naive approach would be to associate each body part with its nearest neighbor in terms of Euclidian distance using an optimal bipartite assignment method, such as the Hungarian assignment algorithm (sometimes referred to herein as the "Hungarian algorithm"). However, due to the elongated shape of pigs, this approach may be prone to failure in cluttered environments, as illustrated in FIGS. 2A and 2B.

FIG. 2A is an image 200 that shows two nearby pigs 130, 132 with body parts properly annotated. Whole instances are formed by joining the parts together through part association. As shown in an image 202 of FIG. 2B, an optimal Euclidean nearest-neighbor part association is prone to failure when the animals are in close proximity, because the body parts that are closest together (e.g., the body parts within the black ovals) may not correspond to body parts of the same whole-animal instance.

Figure 11:
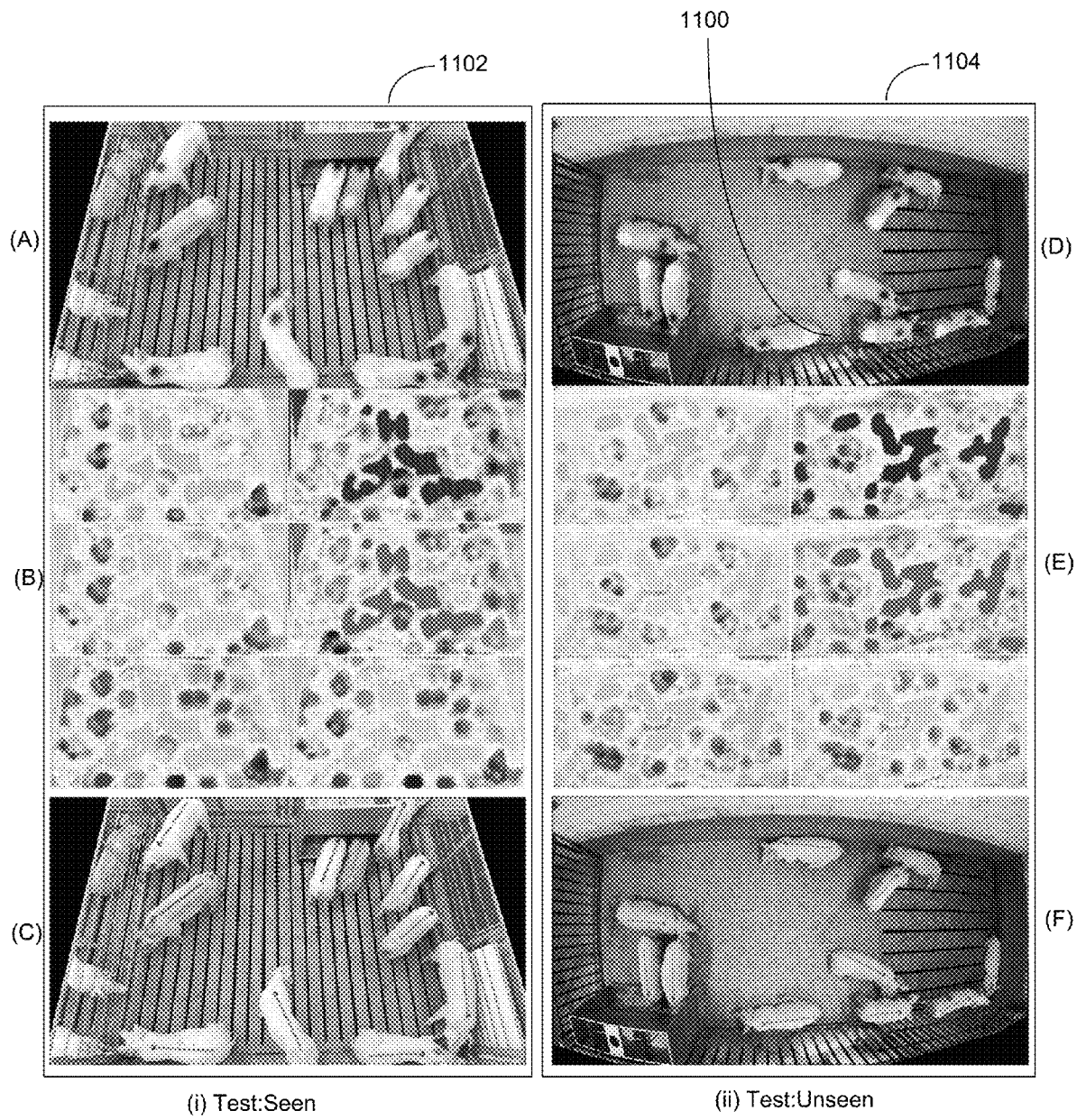
FIG. 11 shows examples of successful instance detection from (i) the test:seen set and (ii) the test:unseen set.

The inventive method uses additional channels in the target output (e.g., the target output of a neural network) to encode body part locations with 2D vector offsets to other body parts belonging to the same animal. These offsets represent the direction and distance in pixels from one body part to another. While there are a total of $$\binom{4}{2} = 6$$

part pairs that exist between the four parts, in this example, the target output is designed to represent only three pairs in order to reduce unnecessary redundancy (e.g., vectors joining tail-to-left-ear can be closely approximated by combining a vector joining the tail-to-shoulder and then the shoulder-to-left-ear). Specifically, in this example, 12 channels are used to represent three part pair associations, as listed in Table 2 shown in FIG. 15. The three part pairs and their associated channels are given below:

Channels 5-8: Left Ear↔Shoulder
Channels 9-12: Right Ear↔Shoulder
Channels 13-16: Shoulder↔Tail Table 2 shows channels 5-16 of the image-space representation used to represent pig locations and orientations (i.e., the target output). Pairs of neighboring channels correspond to the x and y offset between neighboring parts. Overall, these 12 channels represent bidirectional vectors linking three pairs of body parts. FIG. 11, diagram (B) includes six sub-images that represent vector associations. The upper-left sub-image represents channels 5 and 6, the upper-right sub-image represents channels 7 and 8, the middle-left sub-image represents channels 9 and 10, the middle-right sub-image represents channels 11 and 12, the lower-left sub-image represents channels 13 and 14, and the lower-right sub-image represents channels 15 and 16.

In some implementations, the various channels of the target output (including channels 1-16) are formed by combinations of a common set of features produced by a single neural network. For example, channels 1-4 and channels 5-16 can be simultaneously produced using a common set of neural network layers. Consequently, the channels 1-4 and channels 5-16 are not completely independent, but to some degree, the network likely separates the features that are used by different channels in some of its later layers.

In FIG. 11, diagram (B), a first one of the six sub-images indicating vectors from a tail location to a shoulder location assigns vectors at every pixel, even at pixels where there is no pig. This sub-image (i.e., the lower-left sub-image) corresponds to channels 13 and 14 in Table 2 of FIG. 15. Assigning vectors at every pixel, even at pixels where there is no pig, serves an important purpose: separating detection from association. Consider a scenario where the vector associations were only produced at body part locations, and zeros were produced everywhere else. If a tail were present at pixel (100, 200) and a shoulder were at (200, 300), the values that are supposed to exist at pixel location (100, 200) in channels 13 and 14 would be 100 and 100 (respectively) pointing to the matching shoulder. However, if the network was not sure if a tail is present in that location, it would tend toward outputting 0 and 0 in channels 13 and 14. With 50% confidence, it would then be trained to output 50 and 50, which would point in the right direction, but to a different location in the image. Thus, the uncertainty in the presence of a tail would affect the affinity values. To avoid this, the network assumes the presence of a tail at all pixels in the image when constructing the target output and assigns a vector at every pixel. For each pixel, the network estimates the location of the shoulder that is associated with the tail, and assigns a vector that indicates a position of the shoulder relative to the tail. Thus, each vector corresponds to an estimated pair of tail portion and shoulder portion. The assignment of tail-to-shoulder association vectors is performed separately from detection of the tail location.

In FIG. 11, diagram (B), a second one of six the sub-images indicating vectors from a shoulder location to a tail location assigns vectors at every pixel. The network assumes the presence of a shoulder at all pixels in the image when constructing the target output and assigns a vector at every pixel. This sub-image (i.e., the lower-right sub-image) corresponds to channels 15 and 16 in Table 2 of FIG. 15. For each pixel, the network estimates the location of the tail that is associated with the shoulder, and assigns a vector that indicates a position of the tail relative to the shoulder. Thus, each vector corresponds to an estimated pair of shoulder portion and tail portion.

In FIG. 11, diagram (B), a third one of six the sub-images indicating vectors from a shoulder location to a left ear location assigns vectors at every pixel. The network assumes the presence of a shoulder at all pixels in the image when constructing the target output and assigns a vector at every pixel. This sub-image (i.e., the upper-left sub-image) corresponds to channels 5 and 6 in Table 2 of FIG. 15. For each pixel, the network estimates the location of the left ear that is associated with the shoulder, and assigns a vector that indicates a position of the left ear relative to the shoulder. Thus, each vector corresponds to an estimated pair of shoulder portion and left ear portion.

In FIG. 11, diagram (B), a fourth one of six the sub-images indicating vectors from a left ear location to a shoulder location assigns vectors at every pixel. The network assumes the presence of a left ear at all pixels in the image when constructing the target output and assigns a vector at every pixel. This sub-image (i.e., the upper-right sub-image) corresponds to channels 7 and 8 in Table 2 of FIG. 15. For each pixel, the network estimates the location of the shoulder that is associated with the left ear, and assigns a vector that indicates a position of the shoulder relative to the left ear. Thus, each vector corresponds to an estimated pair of left ear portion and shoulder portion.

In FIG. 11, diagram (B), a fifth one of six the sub-images indicating vectors from a shoulder location to a right ear location (i.e., the middle-left sub-image) assigns vectors at every pixel. The network assumes the presence of a shoulder ear at all pixels in the image when constructing the target output and assigns a vector at every pixel. This sub-image corresponds to channels 9 and 10 in Table 2 of FIG. 15. For each pixel, the network estimates the location of the right ear that is associated with the shoulder, and assigns a vector that indicates a position of the right ear relative to the shoulder. Thus, each vector corresponds to an estimated pair of shoulder portion and right ear portion.

In FIG. 11, diagram (B), a sixth one of six the sub-images indicating vectors from a right ear location to a shoulder location assigns vectors at every pixel. The network assumes the presence of a right ear at all pixels in the image when constructing the target output and assigns a vector at every pixel. This sub-image (i.e., the middle-right sub-image) corresponds to channels 11 and 12 in Table 2 of FIG. 15. For each pixel, the network estimates the location of the shoulder that is associated with the right ear, and assigns a vector that indicates a position of the shoulder relative to the right ear. Thus, each vector corresponds to an estimated pair of right ear portion and shoulder portion.

While we describe the tail-to-shoulder association vector here as an example, the same is true for all body part pairs. For example, for channels 7 and 8, the neural network examines each pixel location (i.e., each of the pixels in the image), assumes the pixel corresponds to a left ear, estimates the likely location of the shoulder of the same pig, and outputs the x and y offset values in channels 7 and 8.

Each of the 12 channels encodes a real-valued offset from one point to another. Much like the part detection mappings, these vectors are encoded regionally into the spatial dimensions of the image. FIGS. 3A to 3D illustrate this encoding for a pair of side-by-side pigs. The diameter of the circular regions is denoted $d_n$ for each pig n in the image, and it is proportional to the standard deviation used for the Gaussian kernel used in the previous section. For visualization purposes, each of the six images in FIGS. 3B and 3C represent the direction and distance between part pairs as a color, where the hue represents the direction and the saturation represents the magnitude of the vector connecting the part pair (encoding provided in FIG. 3D). FIG. 3C further illustrates the lines joining the parts to one another.

Figure 3B:
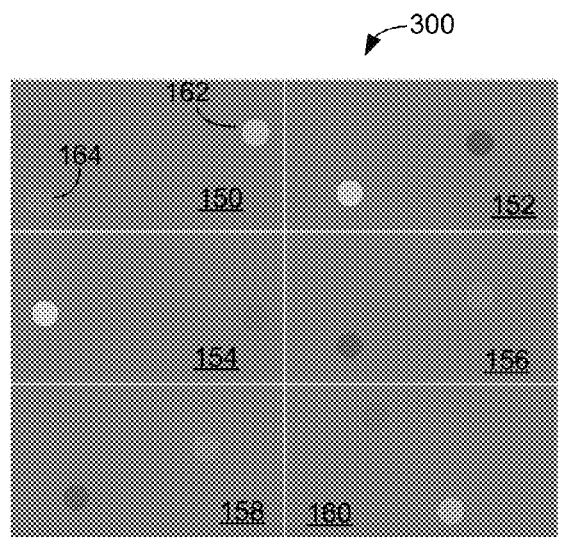
FIG. 3B shows an example target mapping in which the original image in FIG. 3A is mapped to a 12-channel output, where vectors joining three pairs of body parts are encoded into circular regions in channels 5-16 of the output.
Figure 3C:
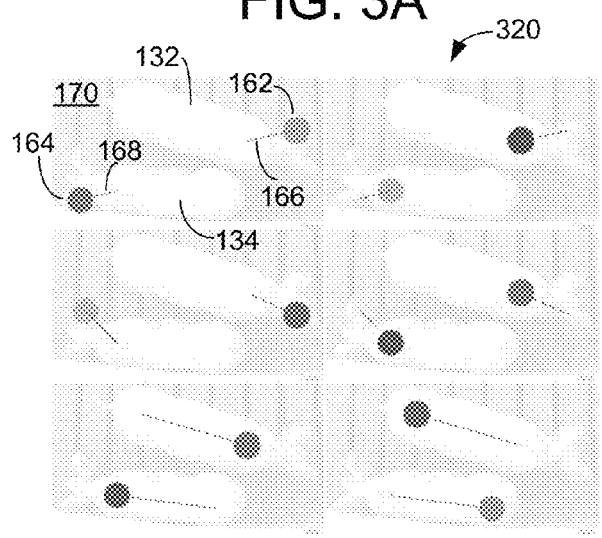
FIG. 3C shows an example overlay that shows the locations of the vector encodings and their magnitude and direction (illustrated by the gray line) in relation to the original image.

In FIGS. 3A to 3D, the original image 131 in FIG. 3A is mapped to a 12-channel output 300 shown in FIG. 3B, where vectors joining three pairs of body parts are encoded into circular regions in channels 5-16 of the output. In FIG. 3B, the upper left sub-plot 150 shows circular regions 162, 164 that provide data about locations of the left ears and the directions and distances of the associated shoulders. The upper right sub-plot 152 provides data about locations of the shoulders and the directions and distances of the associated left ears. The middle left sub-plot 154 provides data about locations of the right ears and the directions and distances of the associated shoulders. The middle right sub-plot 156 provides data about locations of the shoulders and the directions and distances of the associated right ears. The lower left sub-plot 158 provides data about locations of the shoulders and the directions and distances of the associated tail portions. The lower right sub-plot 160 provides data about locations of the tail portions and the directions and distances of the associated shoulders.

Figure 3D:
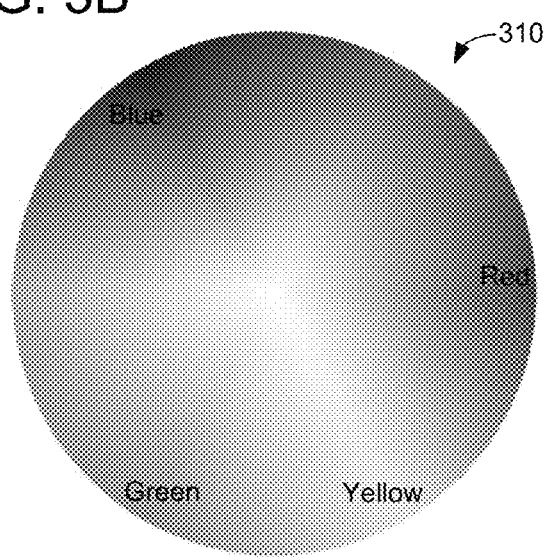
FIG. 3D is a graph showing an example mapping between vectors and colors used in FIGS. 3B and 3C.

The four colors used in FIG. 3B are for visualization of the direction and magnitude of the vectors, in which FIG. 3D provides a mapping 310 between vectors and colors. FIG. 3C shows an overlay 320 to illustrate the locations of the vector encodings and their magnitude and direction (illustrated by the gray line) in relation to the original image. For example, in the upper-left subplot 170 of FIG. 3C, a line segment 166 represents the direction and distance of the shoulder relative to the left ear of the pig 132. A line segment 168 represents the direction and distance of the shoulder relative to the left ear of the pig 134.

Instances from Part Detection and Association

The goal of the animal detection method described here is to detect all visible parts and group them together in order to form whole-animal instances. The sections "Representation of Body Part Location" and "Representation of Body Part Association" provide a technique for representing body part locations and using vectors to associate the body parts to one another in the form of a 16-channel image-space mapping (i.e., a target output of a neural network).

Figure 4:
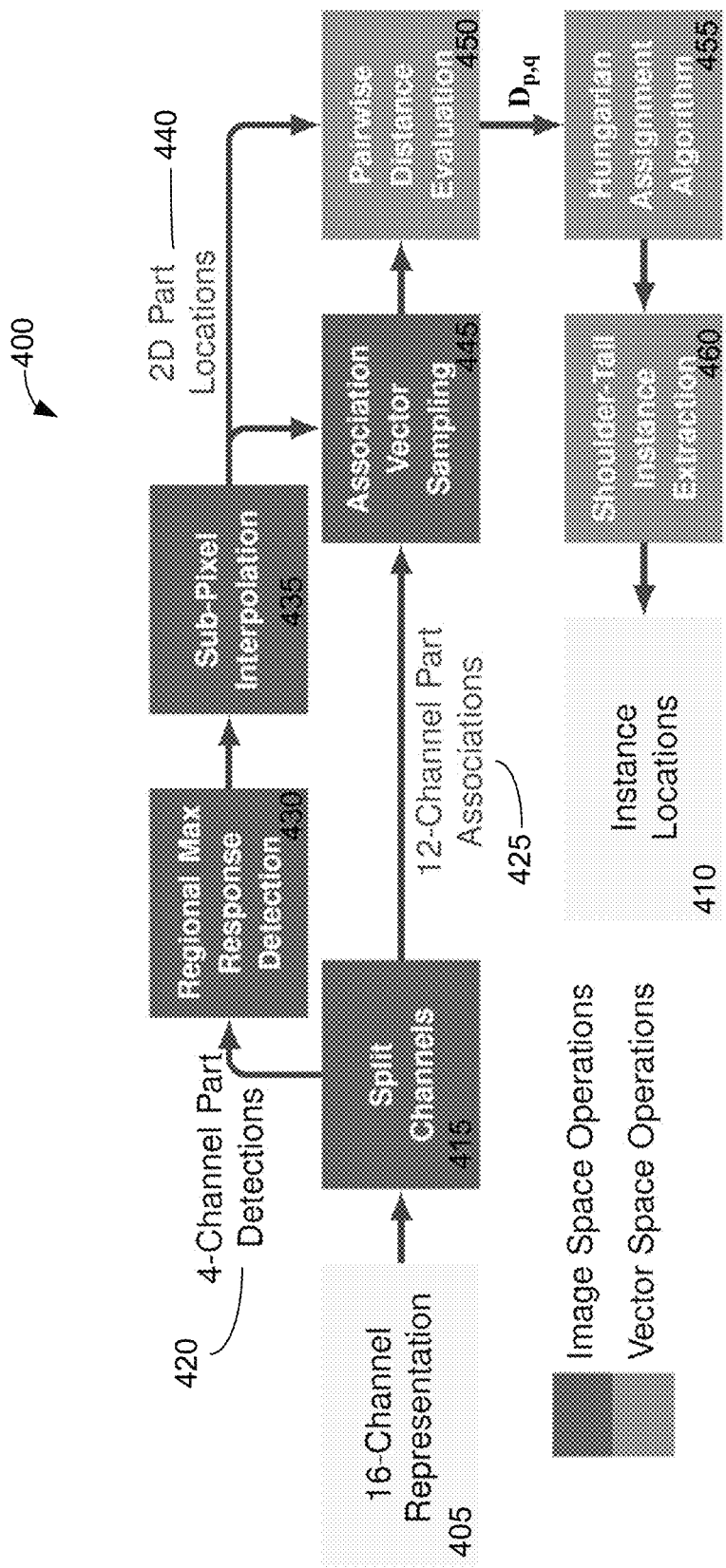
FIG. 4 is a flow diagram of an example animal detection method for converting a 16-channel image space representation to a set of 2D coordinates of visible instances.

Referring to FIG. 4, in some implementations, a process 400 includes a sequence of steps that can be used to translate the 16-channel image-space mapping 405 to a set of discrete instance locations 410. FIG. 4 shows a flow diagram of the animal detection method described here for converting the 16-channel image space representation 405 to a set of 2D coordinates of each visible instance 410. In FIG. 4, image space operations are depicted in pink modules and vectors space operations are depicted in blue modules.

First, the 2D body part locations are extracted from the Gaussian kernels contained in channels 1-4 of the 16-channel representation image-space representation. The first step is to split 415 the 16 channels into 4-channel part detections 420 and 12-channel part associations 425. The precise 2D part locations are represented by the peaks of the Gaussian kernels in the image space mapping. Let $M_p$ be the R×C image space map for body part $p \in \{l, r, s, t\}$, which corresponds with the left ear, right ear, shoulder, and tail, respectively. It is assumed that the number of rows and columns in the input image and output mappings are R and C. The part locations can be extracted from the image space using a form of regional max response detection 430 defined by $$\{p\} = \{(x,y) | M_p(x,y) \geq M_p(x',y') \text{ for all } (x',y') \in R_{(x,y)}\} \text{ for } p \in \{l,r,s,t\}, \quad (1)$$

where $R_{(x,y)}$ is a region surrounding image space location (x, y). In some implementations, each of the part locations is detected if its value in the image space mapping is greater than that of its neighbors (e.g., as determined using max pooling). This works well for detecting the peak pixel coordinates of Gaussian kernels, and it can be further refined by using quadratic sub-pixel interpolation 435. Here, interpolation is performed by replacing the original integer coordinates (x, y) with real number coordinates using $$(x, y) \leftarrow \left( x + \frac{M_p(x-1, y) - M_p(x+1, y)}{2(M_p(x+1, y) + M_p(x-1, y) - 2M_p(x, y))}, \right. \quad (2)$$
$$\left. y + \frac{M_p(x, y-1) - M_p(x, y+1)}{2(M_p(x, y+1) + M_p(x, y-1) - 2M_p(x, y))} \right).$$

Given the complete set of detected body part locations 440:

$$\{p_1, \ldots, p_{N_p}\} = \{(x_{p1}, y_{p1}), \ldots, (x_{pN_p}, y_{pN_p})\} \text{ for } p \in \{l, r, s, t\}, \quad (3)$$

the next step is to estimate the locations of associated parts using an association vector sampling 445 of the 12-channel part associations mapping 425. The 12 dimensions of the association mapping 425 will be denoted $$[M_{l \to s}^x M_{l \to s}^y M_{s \to l}^x M_{s \to l}^y M_{r \to s}^x M_{r \to s}^y M_{s \to r}^x M_{s \to r}^y$$
$$M_{s \to t}^x M_{s \to t}^y M_{t \to s}^x M_{t \to s}^y]$$

and the estimated location of an associated part q from location $p_n$ can be obtained using $$(p \to q)_n = (x_{p_n} - M_{p \to q}^x(x_{p_n}, y_{p_n}), y_{p_n} - M_{p \to q}^y(x_{p_n}, y_{p_n})) \text{ for all } n=1, \ldots, N_p. \quad (4)$$

$M_{s \to t}^x(x_{s1}, y_{s1})$ represents the x offset of the tail relative to the shoulder, in which the shoulder is at location $(x_{s1}, y_{s1})$. If the shoulder is at (10, 25) and the tail is at (30, 40), then $M_{s \to t}^x(10, 25)$ is equal to 30−10=20, and $M_{s \to t}^y$ is equal to 40−25=15.

To join parts together, the distance between the estimated part locations and the actual locations are first computed using a pairwise distance evaluation 450. This pairwise distance is sometimes referred to herein as an "association distance." Specifically, the association distance between two parts $p_n$ and $q_m$ is given by $$d(p_n, q_m) = \frac{|(p \to q)_n - q_m| + |(q \to p)_m - p_n|}{2}, \quad (5)$$

where |a| denotes the L2-norm of vector a. Overall, this collection of association distances forms a set of three unique distance matrices $$D_{p,q} = \begin{bmatrix} d(p_1, q_1) & d(p_1, q_2) & \ldots & d(p_1, q_{N_q}) \\ d(p_2, q_1) & d(p_2, q_2) & \ldots & d(p_2, q_{N_q}) \\ \vdots & \vdots & \ddots & \vdots \\ d(p_{N_p}, q_1) & d(p_{N_p}, q_2) & \ldots & d(p_{N_p}, q_{N_q}) \end{bmatrix}, \quad (6)$$

where (p=l, q=s), (p=r, q=s), and (p=s, q=t). An optimal assignment between pairs of body parts that minimizes the sum of distances can be obtained by applying the Hungarian assignment algorithm 455 to each distance matrix.

It is important to note that the association distance is not a metric of Euclidian distance between two body parts. Rather it measures a pairwise distance of the actual locations of two associated body parts from their estimated locations relative to the corresponding part of the body part pair. For example, using a bipartite matching criteria, the association distance between a tail and a shoulder is a metric of (i) how close the actual tail location is from the estimated tail location relative to the shoulder, and (ii) how close the actual shoulder location is from the estimated shoulder location relative to the tail. In some cases, the association distance may be scaled to account for variations in the size of individual animals. For example, the association distance can be scaled inversely with respect to the size of the animal since an equal pixel distance within an image may be less significant for larger animals. In some cases, the size of the animal can be estimated using a shoulder-tail length.

Compared to greedy approaches for matching body parts or approaches that only consider an association metric (e.g., association distance) in one direction, using a bipartite matching criteria may have the following advantages. Because the bipartite matching criteria accounts for an association metric in two directions (i.e., shoulder-to-tail and tail-to-shoulder), it is less prone to matching body parts that may be better suited to another body part. For example, a first tail may be very closely associated (i.e., having a low association distance) to a first shoulder in a tail-to-shoulder direction; however, the first shoulder may be more closely associated to a second tail rather than the first tail in a shoulder-to-tail direction. While a greedy unidirectional approach may automatically match the first tail with the first shoulder, a bidirectional approach accounts for the association distances in both directions.

Moreover, unlike part affinity approaches for matching body parts, which sample the image space between detected body parts (e.g., to compare average directions sampled from the part affinity fields to the direction between parts in the image space), the techniques described in this specification consider the association distances at two points corresponding to the two body parts of a body part pair. Compared to part affinity approaches, the techniques described in this specification are better able to handle overlapping animal instances since they do not sample the image space between part locations. For example, if a part of a first pig's body (e.g., between the first pig's tail and shoulder) is occluded by a second pig, sampling the image space between the first pig's tail and shoulder may not be very helpful for matching the first pig's tail and the first pig's shoulder.

Finally, individual animals (i.e., whole-animal instances) are identified as those that contain a joined shoulder and tail. The shoulder-tail instance extraction method 460 begins by identifying matches from the output of the Hungarian assignment algorithm 455 for $D_{s,t}$. Once all instances have been identified, the left and right ear detections can be joined to the shoulder locations of all instances via the output of the Hungarian assignment algorithm 455 for $D_{l,s}$ and $D_{r,s}$.

In some examples, requiring the detection of a shoulder-tail instance to define an animal instance can have the following advantages. Compared to a method that does not establish a set of requisite body parts to define an animal instance, the detection method described herein may be less prone to splitting a single animal instance into multiple instances (e.g. defining the upper body as a first instance and the lower body as a second instance when unusual poses are presented). Consequently, the proposed detection method can have fewer false positive instances, which are more difficult to handle for object tracking applications than false negatives, (which can often be interpolated from neighboring frames of video).

Fully-Convolution Network for Part Detection and Association Mapping

Figure 5:
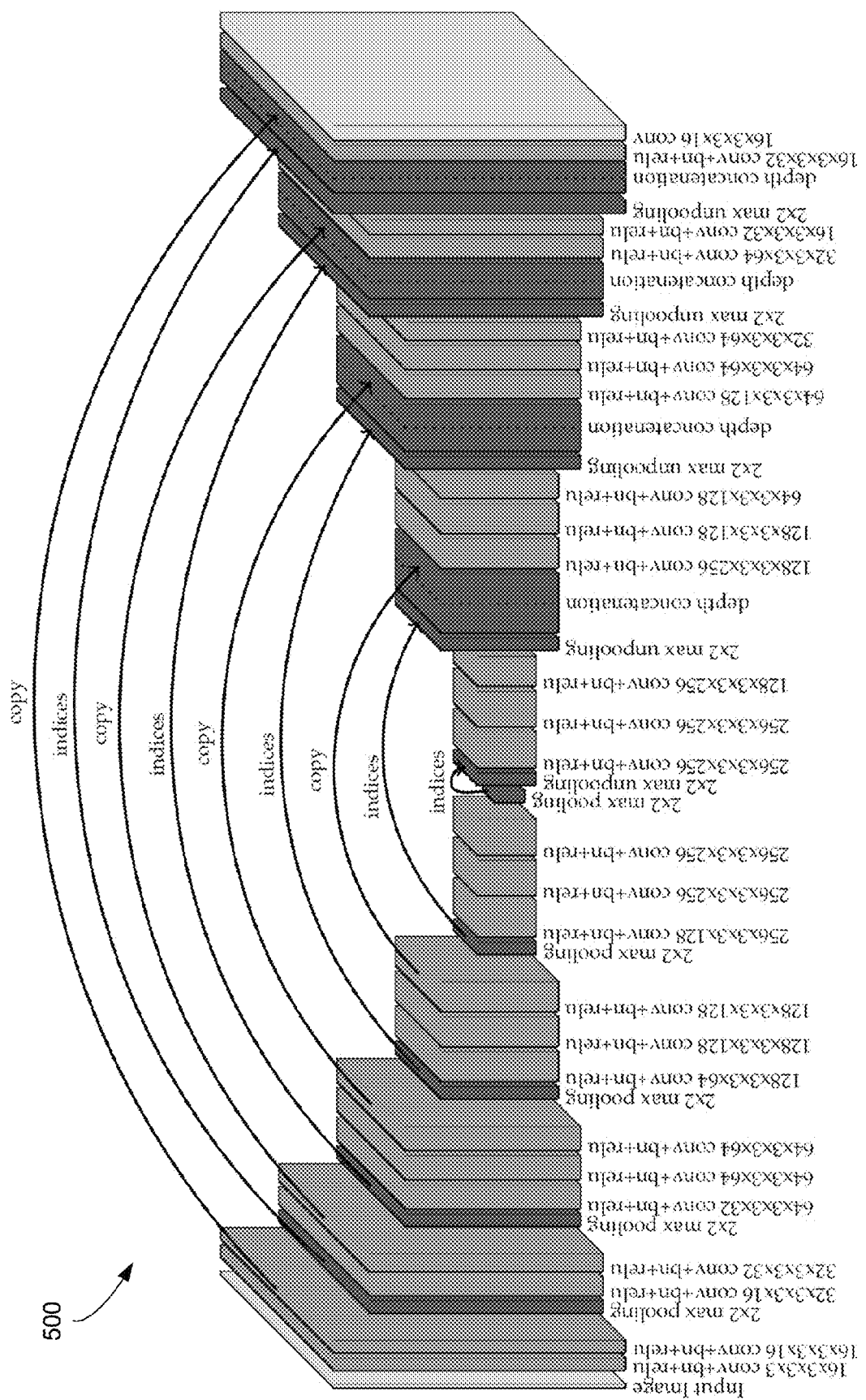
FIG. 5 is a diagram of an example hourglass-shaped network for converting images to 16-channel image space instance detection maps.
Figure 19:
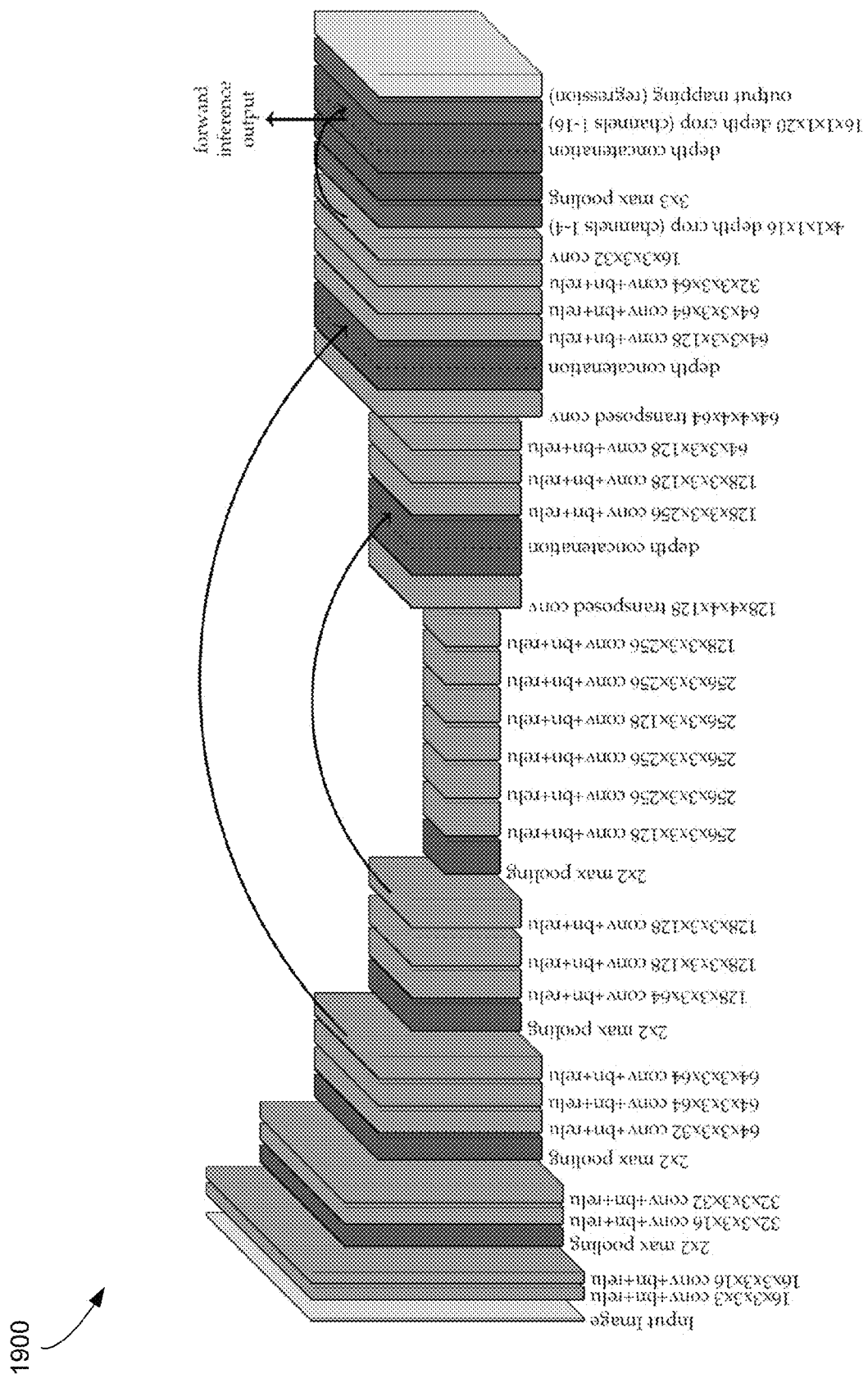
FIG. 19 is a diagram of an example hourglass-shaped network for converting images to 16-channel image space instance detection maps.

A fully-convolutional neural network is used to approximate the 16-channel target output 420, given a red-blue-green (RGB) image as input. In some implementations, referring to FIG. 5, an hourglass-shaped network 500 can be used by the animal detection method described here to convert images to 16-channel image-space instance detection maps. In FIG. 5, "cony" refers to a convolution operation, "bn" refers to a batch normalization operation, and "relu" refers to use of a ReLU activation function. Another example of an hourglass-shaped network 1900 is shown in FIG. 19.

Hourglass networks with symmetry in the downsampling and upsampling stages can be used for pose estimation and image segmentation. In some implementations, the neural network 500 in FIG. 5 can be based on the SegNet architecture that improved upsampling by sharing the indices of each max pooling layer with a corresponding max unpooling layer. This approach can achieve good performance in segmentation tasks by removing the burden of "learning to upsample" from the network.

The network architecture used in this disclosure also incorporates skip-connections in the form of depth concatenation immediately after max unpooling layers. Skip-connections can encourage feature-reuse, thus improving performance with a fixed number of network coefficients. They can decrease the amount of training time required by the network. The U-net architecture further demonstrates the power of skip-connections for hourglass-shaped networks.

During training, the objective function attempts to minimize the mean-squared error between the network output and the target ground truth (e.g., an image representation generated based on human annotation). For the first four channels that correspond to part detections, gradients are back-propagated for all pixel locations regardless of their value. For the last 12 channels, gradients are back-propagated exclusively for pixel locations where the target output is assigned (non-zero). Therefore, a specific output is encouraged in the regions surrounding the point locations. This type of selective training helps to ensure that the vector outputs do not tend toward zero in areas where part detections are uncertain. This approach separates the tasks of detection and association mapping.

Receptive Field

When designing neural networks for visual tasks, it is important that the network is able to "see" the entirety of the objects it is considering. This viewable area is referred to as the "receptive field." To derive the receptive field, the effective stride length between adjacent coordinates in the feature map is calculated using $$S_{l_{effective}} = S_{l-1_{effective}} \times S_l, \quad (7)$$

where $s_l$ is equal to the stride length at layer block t in the network and $s_0=1$. Note that, in the network described here, the max pooling layers have $s_l=2$ and the max unpooling layers have $s_l=0.5$, while other layers have $s_l=1$. The overall stride length essentially relates the resolution of a downsampled feature map to the original input size. Given $s_l$ for all l in the network, the receptive field size can be calculated using $$r_l = r_{l-1} + (w_l - 1) \times s_{l-1}, \quad (8)$$

where $w_l$ is the convolutional kernel width at layer l and $r_0=1$. In the network described here, each convolutional kernel has a width $w_l=3$. Because of the stochastic nature of max pooling and max unpooling operations, it is difficult to define their effective kernel size. Therefore, in this analysis, we have used the lower bound of $w_l=1$ for the pooling operations.

As shown in FIG. 16, Table 3 shows sampling of the receptive field calculations at the output of every layer of the neural network described here. The different types of layers are abbreviated with the following notation: I: input image, C: convolution block, M: max pooling, U: max unpooling, D: depth concatenation, and O: output image. Table 3 provides the receptive field of the network as a function of layer block for a subset of the 41 layer blocks featured in FIG. 5. The receptive field represents the width of a square region in the original image space that affects a single pixel location at the output. In this example, although the receptive field of the network disclosed here is 363, the distance between any two image locations that can affect each other's outputs is 181 (the radius of the receptive field). In some examples, it is recommended that the receptive field size be considerably larger than the maximum object size due to a decaying effect that may be observed on the outer extremes of the square region. As described in the section "Experimental Results" below (which includes subsections "Dataset," "Training Details," "Processing Details," "Instance Detection Performance Metric," "Instance Matching Results," and "Discussion"), the chosen image scale results in pigs that are typically much smaller than the receptive field radius.

While the hourglass-shaped network 500 is provided as an example, various alternative network architectures can be implemented. For example, changes can be made to the number of layers, activation functions, cost function, convolutional kernel size, dimensions of the max-pooling operations and unpooling operations, etc. In some examples, multiple networks may be implemented. For example, a first network may be used to output a 4-channel image representation corresponding to channels 1-4 of the 16-channel representation 405, and a second network may be used to output a 12-channel image representation corresponding to channels 5-16 of the 16-channel representation 405. Other implementations can also be used.

Experimental Results

Dataset

To the best of our knowledge, no open-source dataset exists for pig detection in group-housing environments. Therefore, to enable quantitative evaluation, a new dataset with 2000 annotated images of pigs was introduced. The dataset (http://psrg.unl.edu/Projects/Details/12-Animal-Tracking) depicts 17 different pen locations and includes pigs ranging in age from 1.5 to 5.5 months. Each unique image was randomly extracted from video recordings spanning multiple weeks in each location. More than two hours, on average, existed between samples at each location. Thus, a wide range of unique animal poses were represented in the dataset.

The dataset was divided into two subsets: 1600 images for training and 400 images for testing. Furthermore, the 400 testing images were subdivided into two additional subsets: 200 captured in the same environments seen in the training set (test:seen), and 200 images from environments previously unseen in the training set (test:unseen). The cameras used to capture the images included both a Microsoft Kinect v2 color camera with resolution 1080×1920 and Lorex LNE3162B and LNE4422 color/IR cameras with resolution 1520×2688. All of the environments were captured with the camera mounted above the pen looking down. The distance between the pen floor and the camera varied between 2.5 and 6.0 m, and the specific poses of the cameras ensured that the animal pen of interest was centered and entirely contained within the field of view. Variations in environment and image capture technology were used to ensure that the analysis emphasizes robustness.

Figure 6:
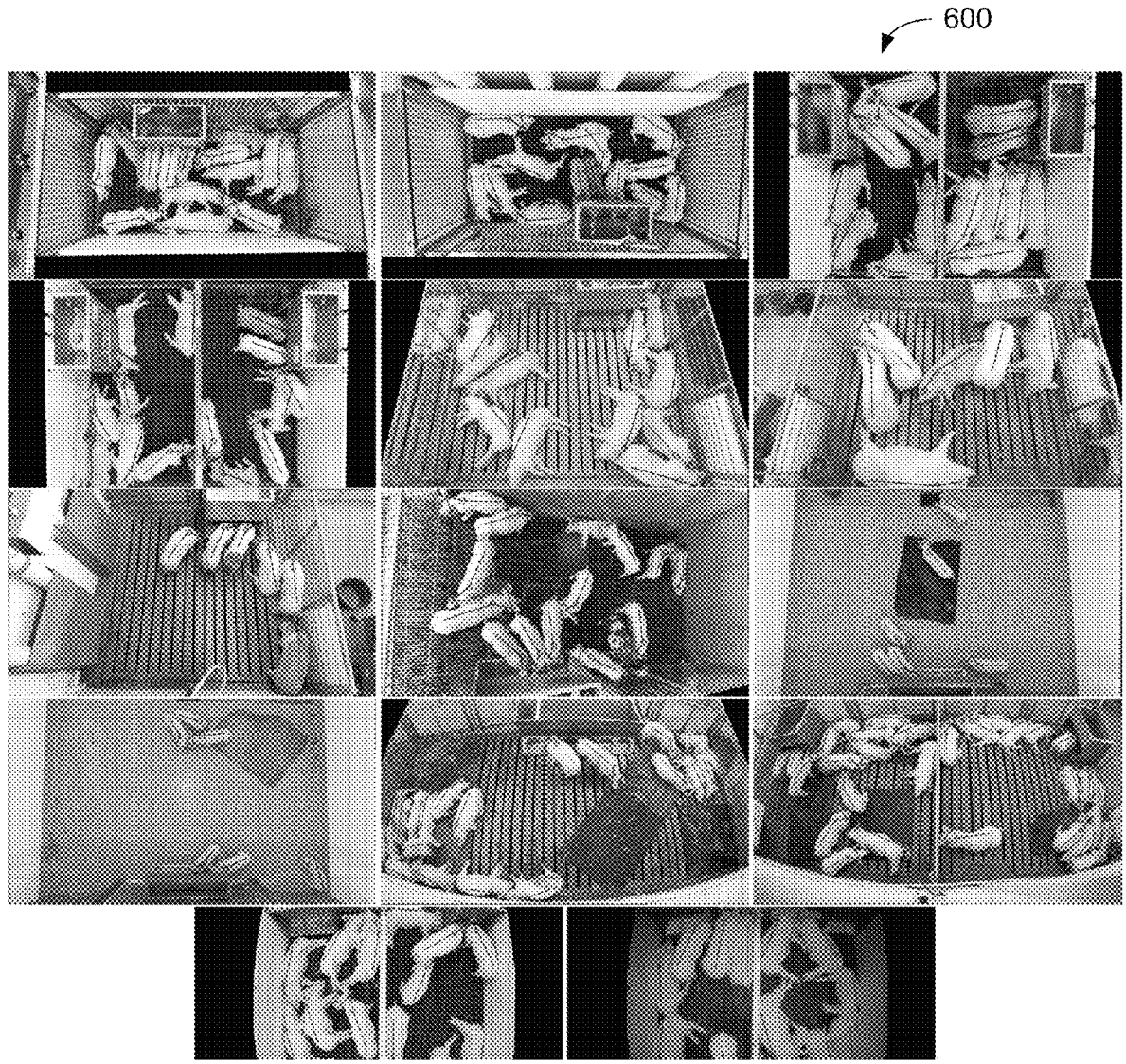
FIG. 6 shows sample images depicting different environments represented in the training set.

FIG. 6 shows sample images 600 from the training set, depicting 13 different pen locations with color-coded annotations for each hand-labeled body part. FIG. 6 shows sample images depicting different environments represented in the training set. The first 13 images (left-to-right, top-to-bottom) were captured during daylight hours with lights on. The last image (from the same environment as the 13th image) was captured using the infrared night vision mode used by the Lorex LNE3162B with active IR illumination. The last two images in FIG. 6 depict the same environment, but one was captured with full color in the daytime and the other was captured with active IR at night. The first 200 images of the testing set (test:seen) were captured in the same environment as the training set, but at different times. Because more than two hours existed between subsequent randomly sampled images, it is likely that each test:seen image contained different animal poses than each training set image.

Figure 7:
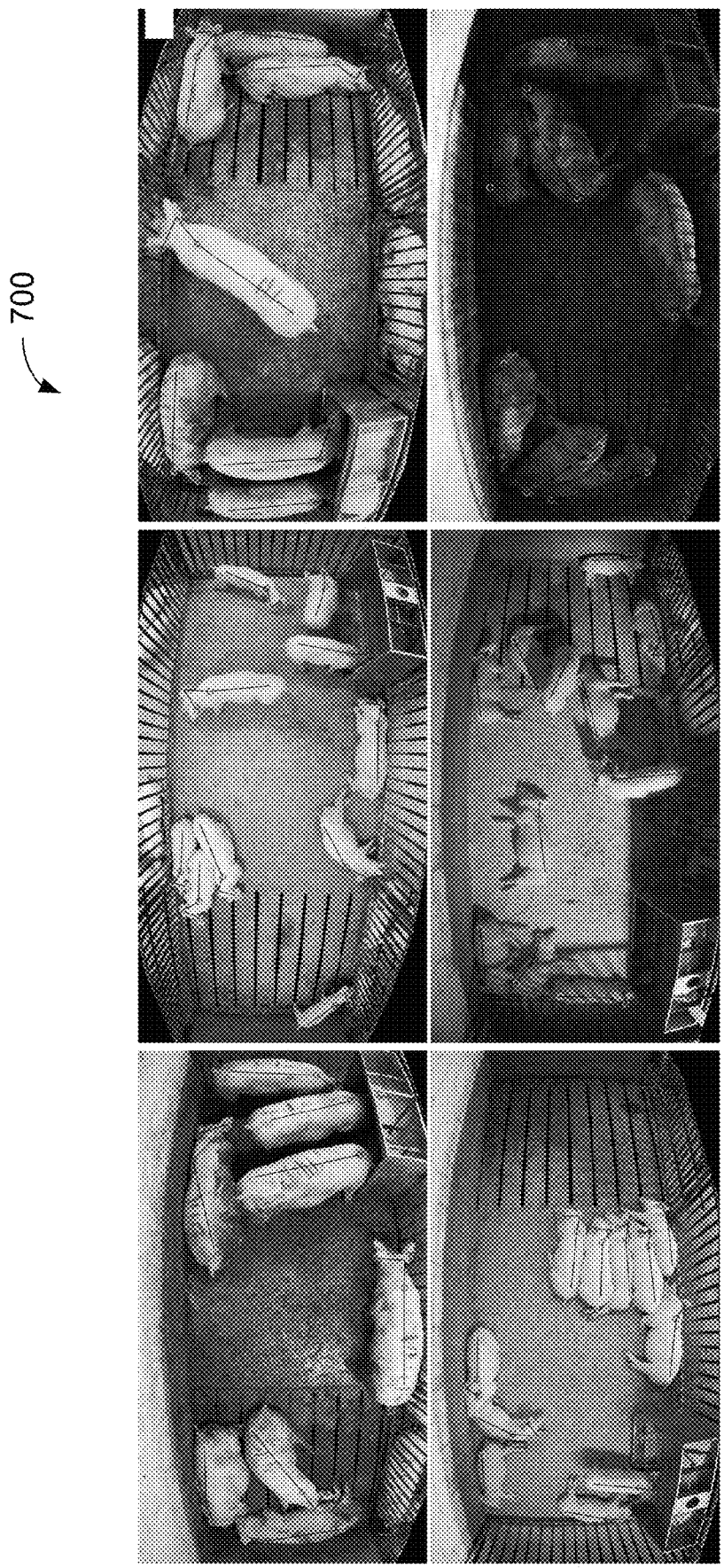
FIG. 7 shows sample images from an "unseen" portion of the testing set.

FIG. 7 illustrates six sample images 700 of the 200 images from the test:unseen set. FIG. 7 shows sample images 700 from the "unseen" portion of the testing set (test:unseen). These images depict environments and lighting conditions not represented in the training set. Not only was this environment previously unseen in the training set, but this set also included challenging lighting conditions that were also not represented among the training images. Twenty images from the training set were captured where the camera's IR night vision was activated, but all of the remaining 1580 training set images (and all of the test: seen images) were captured with overhead lights on. To achieve the challenging lighting conditions present in the test:unseen set, the lights were turned on at 6 am and off at 6 pm every day. For a short duration between approximately 6 pm and 8 pm, ambient lighting dimly illuminated the pens. After 8 pm, the cameras activated night-vision mode and captured IR images while actively illuminating the scene with built-in IR lights. Two of the four pens presented in the test:unseen set were also illuminated with IR flood lights. This had the effect of creating well-lit scenes with harsh shadows and side-lighting.

In each of the images, a user manually annotated the location of the left ear (red), right ear (green), shoulder (blue), and tail (yellow) for each visible animal in that order. Annotations belonging to the same instance are connected with a continuous black line. If ears were not visible, they were not annotated, however, emphasis was placed on annotating both shoulders and tail for each instance even when these locations are occluded, i.e., both shoulder and tail were annotated as long as they are located in the pen of interest and their estimated positions were within the field of view of the camera.

In some cases, pigs from adjacent pens were partially visible through bars that separate the pens. These partially visible pigs were not annotated. It was assumed that a camera placed above a pen is responsible for detecting only animals in that pen and, while some areas of the image belonging to the adjacent pen were masked out, it was difficult to remove partially visible pigs from the image without unintentionally masking out pigs within the pen of interest. In practice, areas of interests were defined by polygons for each image in the dataset and masking out was done by setting all pixels outside the area of interest to pure black. Examples of masked out regions can been seen in FIGS. 6 and 7, where the blacked out regions correspond to areas with pigs in adjacent pens.

Training Details

Figures 8A, 8B, 8C:
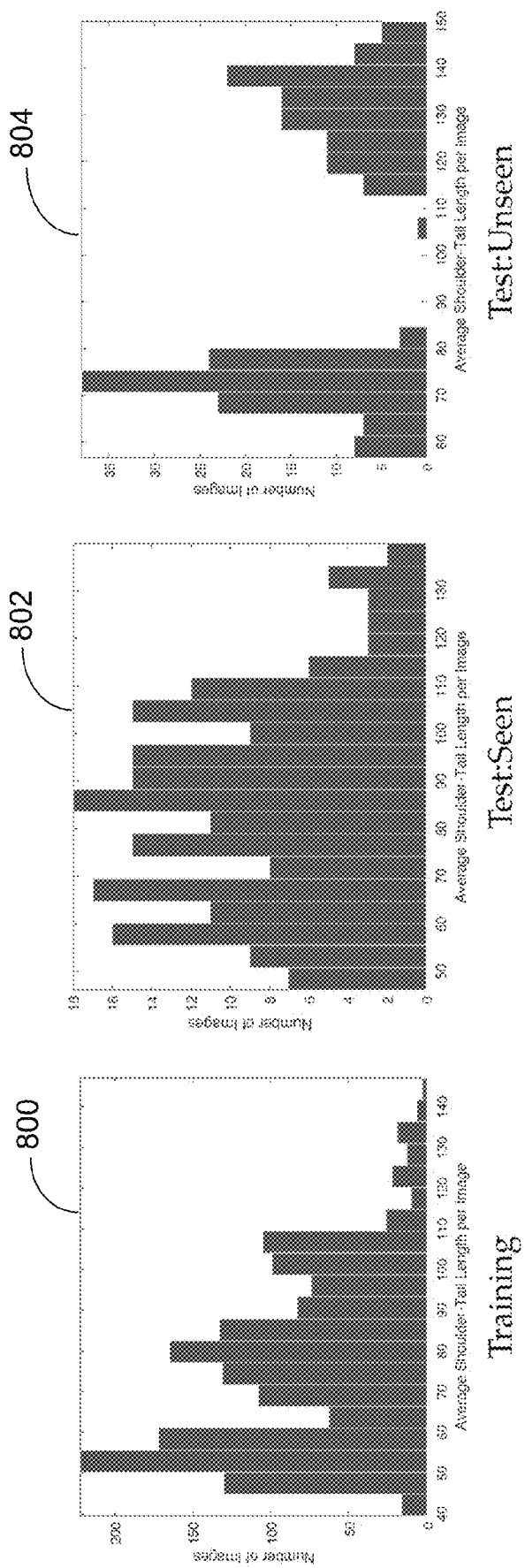
FIGS. 8A-8C show example distributions of the average length from shoulder to tail in each partition of the dataset.

Prior to training the network, images were downsampled so that the number of columns was 480. This was empirically deemed to be a sufficient resolution for discerning the parts of interest while remaining small enough for the computing hardware to process multiple images per second. The average length of pigs in each image after downsampling are presented in the histograms of FIGS. 8A-8C. FIG. 8A is a graph 800 that shows the distribution of the average length from shoulder to tail in the training partition of the dataset. FIG. 8B is a graph 802 that shows the distribution of the average length from shoulder to tail in the Test: Seen partition of the dataset. FIG. 8C is a graph 804 that shows the distribution of the average length from shoulder to tail in the Test:Unseen partition of the dataset.

While the majority of the pigs had a body length of less than 100 pixels, there were some that exceed 140 pixels in length. For these pigs, it was important that the network 500 was able to "see" the entirety of the pig as it estimated the body part locations and vector associations. In the section "Fully-Convolution Network for Part Detection and Association Mapping," the radius of the receptive field was found to be 181 using the network 500 described here. Therefore, the network was capable of observing the entire animal even in the most extreme images where the shoulder-to-tail distance approached 140 pixels.

Target images for training the fully-convolutional network were created by adapting the size of the Gaussian kernels used to mark each part in channels 1-4 (FIG. 1B) to the size of the animals. This adaptation encouraged continuity of image-space annotations between different environments and ages/sizes of pigs. Specifically, this is achieved by first computing the average distance between the shoulder and tail for all instances, denoted $\mu_{s \to t}$, to provide a numerical representation of the average size of pigs in the image space. Then, the shoulder-to-tail distance for instance n, given by $\delta_{s \to t}$, was combined with the average distance in order to compute the Gaussian kernel standard deviation, defined as $\sigma_n = 0.16 \times (\mu_{s \to t} + \delta_{s \to t})$. This combination was used to prevent unusual animal poses from shrinking the size of the kernels too much, while still allowing some adaptation to individual size variations. The scale factor of 0.16 was determined empirically to provide a suitable approximation to the variability of human annotations. If $\sigma_n$ was too large, kernels belonging to nearby pigs interfered with each other and often resulted in a single part location being extracted by regional maximum detection. When $\sigma_n$ was too small, the network training unfairly applied a penalty to kernels that were not exactly equal to the location provided by the human annotator, even if the kernel's location was within the natural variance of human annotations. Finally, the Gaussian kernels were then multiplied by a scalar value in order to set their maximum value to 1.0 and, in cases where two nearby Gaussian kernels for the same body part intersected, the output was simply assigned to the maximum of the two Gaussian kernel values. Scaling the kernels so that the peak is 1.0 helped to ensure that a fixed threshold can be used in peak detection regardless of $\sigma_n$.

The circular regions used to assign association vectors between parts in channels 5-16 (FIG. 3B) should ideally have covered all possible pixel locations where the part might be detected. In practice, this area can be sufficiently covered by considering regions where the Gaussian kernel for each part had a magnitude greater than 0.2. In situations where one region intersected with another, the target output vector was composed of a weighted combination of the two intersecting vectors. The weights in these circumstances came from the corresponding Gaussian kernel magnitude at each pixel location.

The network was trained using heavy augmentation of both input and target images. Augmentations included random left-right flipping, random rotations sampled from a uniform distribution ranging from 0° to 360°, random scaling sampled uniformly between 0.5 and 1.5, and XY shifts uniformly sampled from the range of ±20 pixels along both dimensions. Careful consideration was needed for augmenting the 16-channel target image. Rotations and scaling were applied spatially to both the association vector regions and also the output values along pairs of channels that correspond to XY offsets between body parts. Left-right flips were handled by switching the labels for left and right ears.

Processing Details

After obtaining the 16-channel mapping 405 from the trained network 500, each of the part location maps (channels 1-4) and the association maps (channels 5-16) were smoothened using a 5×5 averaging box filter. This step would not be necessary to extract information from ground truth mappings, but it was beneficial for reducing the effects of noise on regional maximum response detection 430. In practice, box filtering was done by adding an average pooling layer to the end of the neural network. The size of regions $R_{(x,y)}$ used in (1) consisted of a 15×15 window surrounding each pixel (x, y).

The animal detection method was implemented in Matlab 2018b using the deep learning toolbox. A desktop computer, equipped with an Intel i7-6700K CPU, 32 GB of RAM, and an NVIDIA GTX1070 GPU was used for training and inference. The approximate time required by the fully-convolutional neural network to perform forward inference is 0.24 s and it took an additional 0.01 s to find instance locations. Thus, the system was capable of fully processing four frames per second.

Instance Detection Performance Metric

The goal of the animal detection method described here is to identify the location and orientation of each pig in a given image. Although the animal detection method generated detections and associations for four body parts, only the shoulder and tail location were used to identify a complete (i.e., whole-animal) instance. This decision was based on two factors. Firstly, they are sufficient for approximating the center-of-mass location and orientation of each animal and, second, special emphasis was placed on ensuring their labeling by human annotators. Given a complete set of N ground truth shoulder-tail pairs $\{(s_1, t_1), \ldots, (s_N, t_N)\}$ and a set of M estimated shoulder-tail pairs $\{(\bar{s}_1, \bar{t}_1), \ldots, (\bar{s}_M, \bar{t}_M)\}$, an association method was needed to determine if an estimate corresponded to the ground truth, since both sets of pixel coordinates were unlikely to contain exactly the same values.

Figure 9:
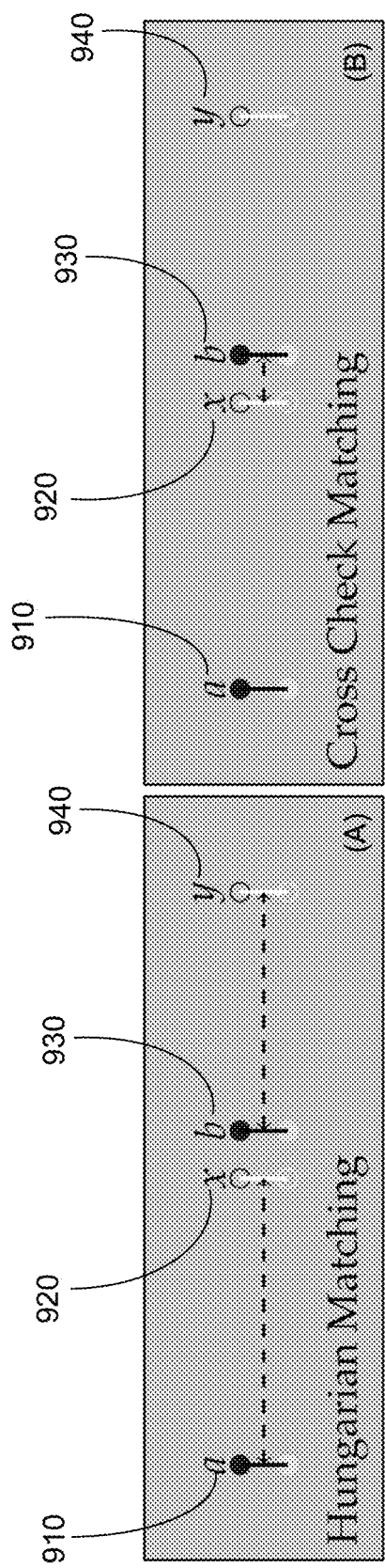
FIG. 9 is a diagram showing example results of matching two ground truth instance locations and two detected instances using both the Hungarian assignment algorithm and cross-check matching.

Bipartite matching problems are commonly solved with a Hungarian assignment. However, this can sometimes lead to matches between far-away pairs in order to minimize a global cost. For this particular matching problem where shoulder-tail pairs are associated with each other, there was likely to be very little distance between the ground truth and detected positions. In some cases, setting the maximum distance allowed between matching pairs can fix this issue, but it comes at the cost of introducing additional parameters that depended on image resolution and the relative sizes of animals. To avoid parameterization, the strict cross-check matching criteria was used here to assign estimates to the ground truth only when they were each other's minimum cost matches. More formally, two instances n and m matched if and only if $$m = \underset{m \in \{1,\ldots,M\}}{\operatorname{argmax}} |s_n - \tilde{s}_m| + |t_n - \tilde{t}_m| \qquad (9)$$

and $$n = \underset{n \in \{1,\ldots,n\}}{\operatorname{argmax}} |s_n - \tilde{s}_m| + |t_n - \tilde{t}_m|, \qquad (10)$$

where ‖ denotes the L2 norm. FIG. 9 illustrates the advantage of using the cross-check method instead of the unparameterized Hungarian algorithm. FIG. 9 shows an example with two ground truth instance locations 910 and 930 and two detected instances 920 and 940 using matching results achieved with both the Hungarian algorithm (sub-image (A)) and the cross-check matching (sub-image (B)) of Equations (9) and (10). While the detection x 920 and ground truth location b 930 in the middle are clearly nearest neighbors of one another, they are not matched by the Hungarian algorithm (sub-image A). Instead, in an effort to minimize the global matching cost, the Hungarian algorithm (sub-image A) assigns ground truth location a 910 to detection x 920 and ground truth location b 930 to detection y 940. In contrast, the cross-check matching method (sub-image B) leaves the outer detection y 940 and ground truth location a 910 unmatched while correctly assigning the two in the middle, x 920 and b 930, together.

Instance Matching Results

Figures 10A, 10B, 10C:
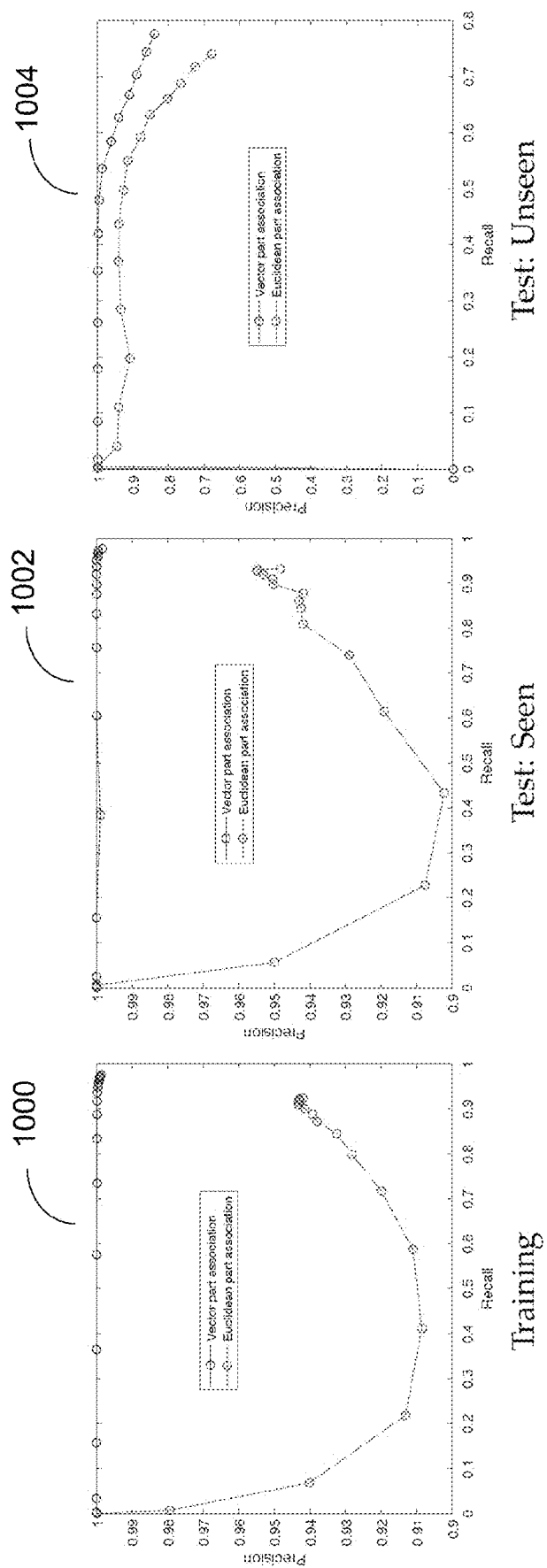
FIGS. 10A-10C show graphs of precision-recall curves for both the animal detection method and an alternative association strategy that assigns parts to one another by minimizing Euclidean distance.

In order to evaluate the effectiveness of the vector part association method, it was compared to an alternative Euclidean part association method. The Euclidean part association method joins parts together by simply minimizing their Euclidean distance. This method, previously illustrated in FIG. 2B, removes the effects of part association vectors on detection performance and allows for a partial ablation study. FIG. 10A is a graph 1000 that presents the precision and recall for the training partition of the dataset. FIG. 10B is a graph 1002 that presents the precision and recall for the Test: Seen partition of the dataset. FIG. 10C is a graph 1004 that presents the precision and recall for the Test:Unseen partition of the dataset. Table 4 (shown in FIG. 17) presents full numerical results over the training set. The table shows detailed results obtained with the animal detection method described here and an alternative association strategy that assigns parts to one another by minimizing Euclidean distance. The table includes true positives (TP), false positives (FP), false negatives (FN), precision, recall, and F-measure for different part detection thresholds.

FIGS. 10A-10C show the precision-recall curves for both the animal detection method described here (i.e., the vector part association method) and the alternative Euclidean part association method. Each sample along the curve corresponds to a different threshold for part detection, where parts are detected only if the neural network output in channels 1-4 exceeds the threshold value. The results are nearly identical across the training set (FIG. 10A) and test:seen set (FIG. 10B), and both illustrate a dramatic improvement achieved by joining parts together using the vector mapping described here. The results on the test:unseen set (FIG. 10C) illustrate possible limitations of the animal detection method when operating on different environments than those used for training.

The results show that the vector part association method described here provides a significant boost to matching precision when compared to Euclidean part association. Less than 0.1% of detections were false positives compared to more than 5% when using Euclidean matching, regardless of threshold. FIGS. 10A and 10B illustrate nearly identical results across training and test:seen sets. This provides a strong indication that the animal detection method was not overfitting to the specific animal poses presented in the training set. Both FIGS. 10A and 10B demonstrate a minimum precision of ≈0.91 at a recall of ≈0.42 for the Euclidean matching method. This was because, at this threshold less than half of the animal parts were being detected but the ones that were detected are matched to their nearest neighbor. As a result, there was a relatively high likelihood that only a shoulder is detected, but not a tail, or vice versa. In an effort to form whole instances, the Euclidean method simply joined together nearest neighbors and many of these instances were not aligned with the ground truth. When the threshold was adjusted higher or lower, there was a higher likelihood that either both shoulder and tail were detected or neither was detected. In either case, this led to improved precision, because the instances that were identified were more likely to be true positives.

Table 5 below shows instance detection results for the training set (1600 images), the test set with images of the same environments in the training set (200 images), and the test set with images of new environments and challenging lighting conditions (200 images). The part detection threshold was fixed at 0.25.

TABLE 5

| | Vector Matching | | | | | |
|---|---|---|---|---|---|---|
| Evaluation Set | TP | FP | FN | Recall | Precision | F-Measure |
| Training | 19,999 | 13 | 743 | 0.964 | 0.999 | 0.981 |
| Test: Seen | 2273 | 1 | 94 | 0.960 | 1.000 | 0.980 |
| Test: Unseen | 1150 | 112 | 573 | 0.667 | 0.911 | 0.771 |

In Table 5, the results are compared across all three partitions of the dataset with a fixed threshold of 0.25. While the F-measure was 0.981 at threshold 0.25, which was lower than the peak F-measure of 0.987 achieved at a threshold of 0.1, the decreased threshold produced more than twice the number of false positives. When F-measure values were nearly identical, the choice of threshold depended on how sensitive an application was to false positives and false negatives. The comparison at threshold 0.25 highlighted both the performance similarities across the training and test:seen sets and the discrepancies between both of those sets and the test:unseen set. One interpretation is that the discrepancy illuminates the importance of environment and lighting variations when training the neural network. The test:seen results were nearly identical to the training results, even though the specific poses of each animal were previously unseen. However, due to the use of heavy image augmentation, similar poses were likely represented during training. In contrast, the test:unseen results were much worse, likely due to the novel environments and challenging lighting conditions not present in the training set images.

By digging deeper into the results and looking at specific examples, it is possible to learn more about the performance discrepancies. An example of 100% successful detections from both test:seen and test:unseen sets are shown in FIG. 11. FIG. 11 shows a set of diagrams 1102 (including diagrams (A), (B), and (C)) that illustrate examples of successful instance detection from the (1) test:seen set, and a set of diagrams 1104 (including diagrams (D), (E), and (F)) that illustrate examples of successful instance detection from the (ii) test:unseen set. The diagrams 1102 includes diagrams (A), (B), and (C). The diagrams 1104 includes diagrams (D), (E), and (F). The top diagrams (A) and (D) depict the first four channels of the neural network output 405. The middle diagram (B) and (E) are each composed of six sub-images and depict the color-coded vector associations from the last 12 channels of the neural network output 405. The bottom diagrams (C) and (F) depict both ground truth locations and estimates using the following color coding: false negative (blue), and true positive (green). Note that these images depict 100% successful detections, so only true positives are present.

Here, the neural network output 405 is illustrated for each of the 16 channels, and the final detections are shown below, where a green line connecting the shoulder to the tail defines a true positive detection. Note that, unlike the target part association maps illustrated in FIG. 3B, the outputs of the neural network do not clearly conform to the part locations. This is because the network 500 was only trained to produce the correct vector (illustrated by color) at part locations and, at all other locations, the network essentially tried to minimize the cost with hypothetical part association vectors in case a part was present in that location. This attempt to minimize cost "in case" was most visible when comparing the part association maps of shoulder-to-tail and tail-to-shoulder (the bottom two sub-images of diagrams (B) and (E) of FIG. 11). Even when the network was highly confident that a location belonged to a tail, it produced an association vector pointing from shoulder-to-tail at that location, just in case a shoulder at that location was mistaken for a tail.

Due to the similar lighting and overall appearance of the (i) test:seen image in FIG. 11, the animal detection method was able to identify every instance within the pen environment with high confidence (as indicated by the first four channel outputs of the neural network, diagram (A) of FIG. 11). However, in the (ii) test:unseen image, the pig behind bars 1100 in the adjacent pen caused some confusion in the network. This was likely due to the fact that the network had never been exposed to this particular pen environment, and thus it had not been trained to ignore partial animals on the other side.

Figure 12:
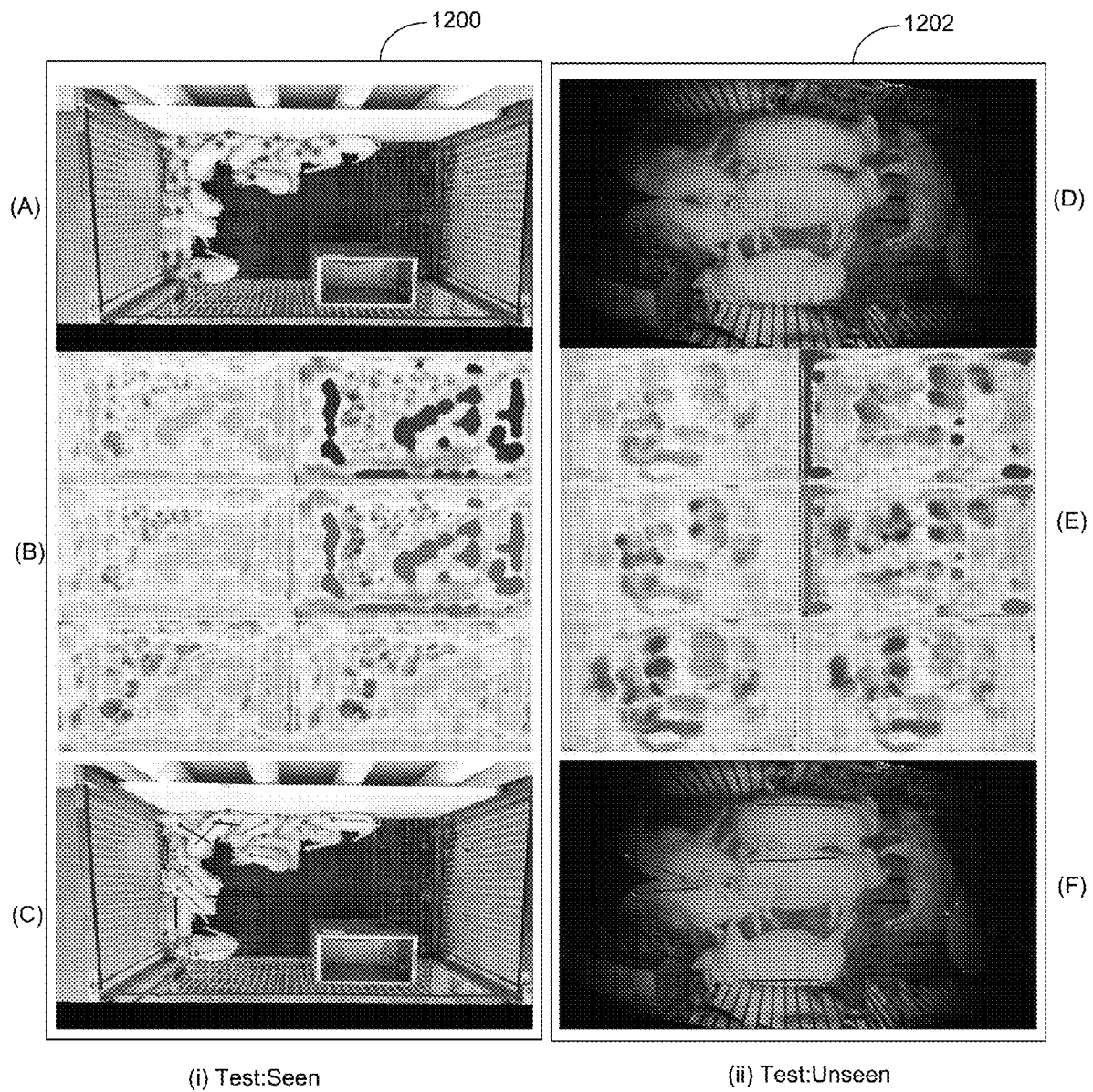
FIG. 12 shows examples of unsuccessful instance detection from (i) the test:seen set and (ii) the test:unseen set.

Alternatively, FIG. 12 illustrates failure cases for both (i) test:seen and (ii) test:unseen images. FIG. 12 shows a set of diagrams 1200 (including diagrams (A), (B), and (C)) that illustrate examples of failure cases from the (i) test:seen set of images, and a set of diagrams 1202 (including diagrams (D), (E), and (F)) that illustrate examples of failure cases from the (ii) test:unseen set of images. FIG. 12 shows examples of unsuccessful instance detection from both the (i) test:seen set and the (ii) test:unseen set. The images in the top diagrams (A) and (D) depict the first four channels of the neural network output. The images in the middle diagrams (B) and (E) are each composed of six sub-images and depict the color-coded vector associations from the last 12 channels of the neural network output 405. The images in the bottom diagrams (C) and (F) depict both ground truth locations and estimates using the following color coding: false negative (blue), and true positive (green).

Referring still to FIG. 12, each of the failures in the (i) test:seen image occurred because of occlusions that made it difficult to discern the location of the shoulders and/or tail. In this case, it was even difficult for a human observer to confidently assign the ground truth locations. On the other hand, failures in the (ii) test:unseen image were not due to occlusions. They can instead be attributed to the unusual lighting conditions and the relatively large presentation of the animals in the image. Both of these properties were not represented in the training set, making it difficult for the neural network to interpret the image.

Figure 13:
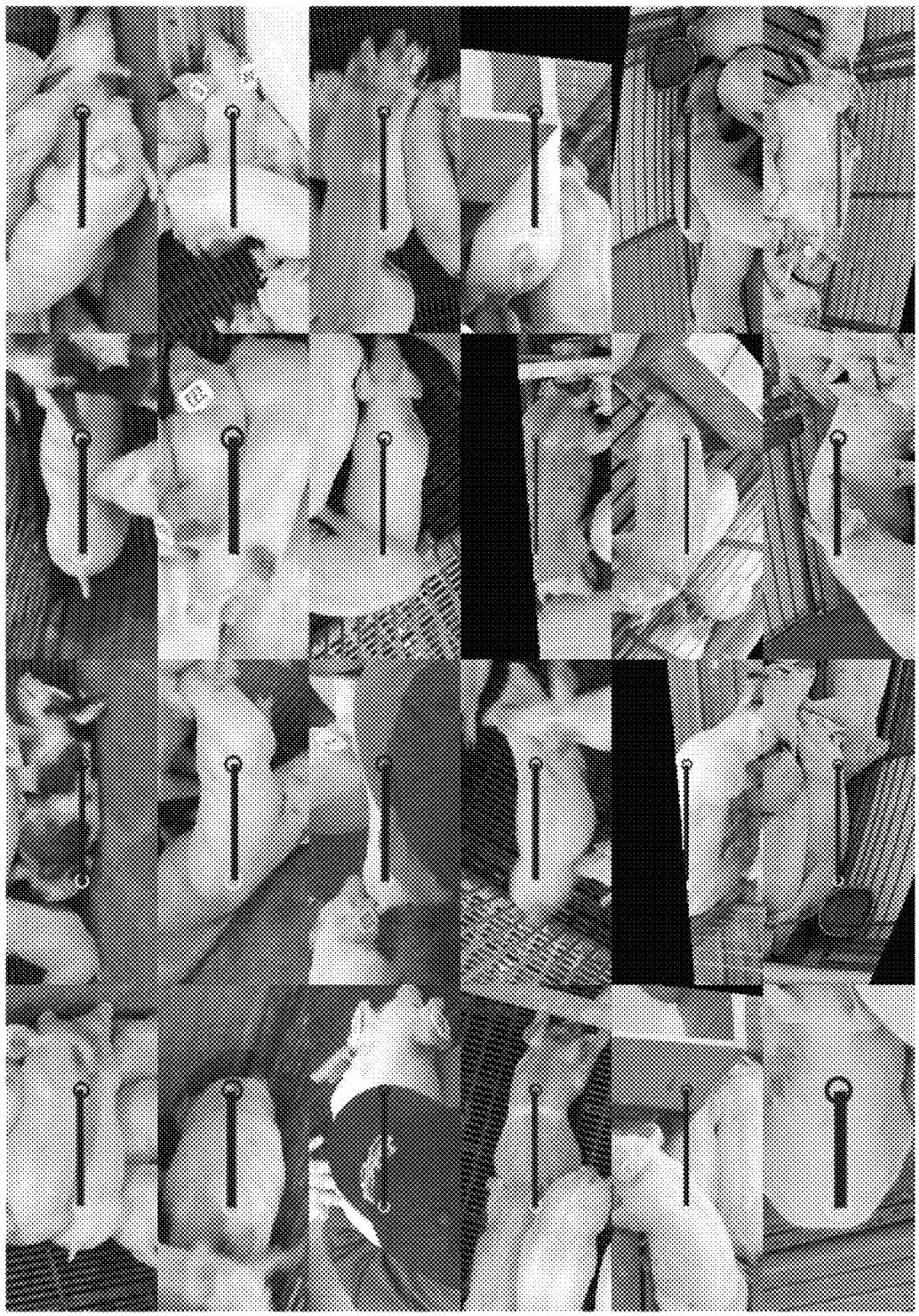
FIG. 13 shows twenty-four random samples of unsuccessful instance detections from the test:seen set.
Figure 14:
FIG. 14 shows twenty-four random samples of unsuccessful instance detections from the test:unseen set.

FIGS. 13 and 14 illustrate 24 failures from the test:seen and test:unseen set, respectively. FIG. 13 shows twenty-four random samples 1300 of unsuccessful instance detections from the test:seen set using the following color coding: false negative (blue), and false positive (red). FIG. 14 shows twenty-four random samples 1400 of unsuccessful instance detections from the test:unseen set using the following color coding: false negative (blue), and false positive (red).

In the test:seen sample set of FIG. 13, 17 of the 23 false negatives can be attributed to occlusions or lack of visibility when the pig approached the edge of the image. Some other causes of error include unusual poses where the head was hidden, and situations where the pig had atypical markings. In contrast, only four false negatives out of 21 from the test:unseen sample set (FIG. 14) can be attributed to occlusion. At least 10 can likely be attributed to lighting conditions. All three false positives occurred when a pig in an adjacent pen was lying next to the dividing bars. The outline of the bars on the pig's body appeared to confuse the network into interpreting this as a smaller body pointed in an orthogonal direction.

Discussion

The animal detection method described here focuses on detecting the location and orientation of individual pigs in group-housing environments. Due to the lack of an available public dataset, it was necessary to create a new collection of annotated images. This presented a challenge in terms of capturing the appropriate level of variability and, while we believe that the chosen images sufficiently represent a variety of environments and ages of pigs, it would likely be beneficial to include more camera angles and more than three types of cameras. In the examples above, the four body part locations (e.g., shoulder, tail, left ear, right ear) were chosen as representatives of the location and orientation of each animal instance. A different set of body parts can also be chosen as representatives of the location and orientation of each animal instance.

Compared to datasets such as ImageNet and COCO, 2000 images may seem like an insufficient number of images to train a deep network. However, pig detection from an overhead camera is a much more specific task than classifying images into one of 1000 categories. With nearly 25,000 different animal poses captured, it is likely that any new pose presented to the network will strongly resemble one that already exists in the dataset. Augmentation is also critical to the success of network training. The chosen network contains nearly 4,000,000 coefficients, so it may be possible to overfit to 25,000 static animal poses, but it is much more difficult to overfit when the angle, size, and left-right orientation are randomized.

The fully-convolutional network introduced in the section "Fully-Convolution Network for Part Detection and Association Mapping" to estimate body part locations and association vectors was designed with sufficient complexity and a wide enough receptive field to achieve high performance levels in terms of precision and recall. The chosen hourglass architecture 500 using max pooling/unpooling with skip connections and depth concatenations is one of many network architectures capable of producing the desired 16-dimensional output representation 405. Atrous convolution, for example can be effective for creating a large depth of field, and spatial pyramid pooling can be used to achieve good performance on multi-scale tasks. One or more of various network architectures can be used to provide a more accurate or efficient instance detection.

By inspecting the specific outputs of the network and the instance formation process, it is understood that errors are most commonly caused when the shoulder or tail of one pig occludes the same body part on another pig. Due to the network's inability to represent multiple part instances in the same image space location, it is only possible for one part instance to be detected in these situations. The vector associations inherently estimate the location of adjacent body parts, therefore, the occlusion can be inferred from the existing output of the network. Alternatively, it may also be possible to augment the dataset to explicitly label occlusions and build the network to detect such events.

In addition to shoulders and tails, the left and right ears were annotated in the dataset and explicitly detected by the network. While the results for instance-level detection do not evaluate the quality of these detections, they can be integrated in some systems as a way to uniquely identify each instance. Ear tags are a common way for livestock to be identified in commercial facilities, and this may provide a convenient way to differentiate between individuals in an otherwise homogeneous population.

In some implementations, the detection method described here can be used within a larger tracking system, in which the detection serves as the first stage for video processing. To this end, the per-frame detection method described here naturally lends itself to multi-object tracking (MOT). Specifically, a sub-category known as tracking-by-detection MOT methods directly process the outputs of per-frame detection methods, and their performance is often strongly tied to the quality of the detector. For this reason, high quality detection methods can contribute to more reliable methods for multi-object tracking.

The animal detection method described here and accompanying dataset introduced here provide a robust solution to instance-level detection of multiple pigs in group-housing environments. This disclosure introduces an image space representation of each pig as a collection of body parts along with a method to join parts together to form full instances. The method for estimating the desired image space representation leverages the power of deep learning using a fully-convolutional neural network 500. Through gradual downsampling and upsampling, the network 500 is able to consider large regions in the image space with a receptive field that covers even the largest pigs in the dataset.

Results demonstrate that the animal detection method is capable of achieving over 99% precision and over 95% recall at the task of instance detection when the network is tested and trained under the same environmental conditions. When testing on environments and lighting conditions that the network had not been trained to handle, the results drop to about 91% precision and 67% recall. These results can be interpreted in one of three ways: (1) networks should be fine-tuned to handle new environments, (2) a larger number and variety of images should be included in the dataset, or (3) the design and/or training methodology should be revised to improve the robustness to environmental variability. As the dataset and the number of environments grows, eventually there may be enough variety such that new environments add little to the network's ability to handle novel presentations. Regarding the third interpretation, while significant augmentations were applied to the input and output images during training, it is difficult for spatial transformations to mimic variations in lighting conditions. Therefore, a new set of non-uniform color-space transformations may provide a solution that improves the robustness of the trained network.

Figure 18:
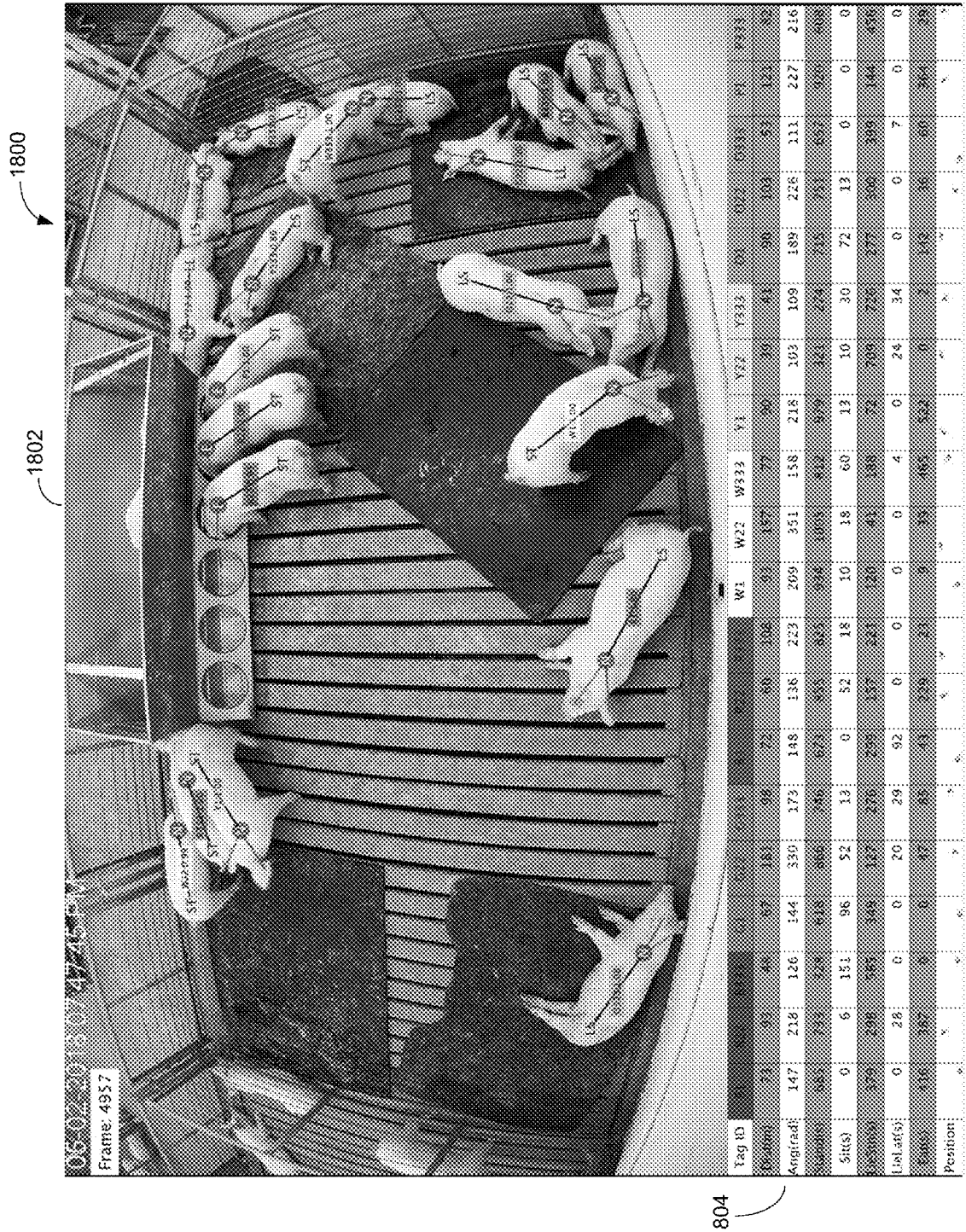
FIG. 18 shows an example of behavior information collected for pigs.

Although some examples have been discussed above, other implementations and applications are also within the scope of the following claims. For example, the system can be used to detect or track animal behaviors and provide statistical information related to the animal behaviors, such as the time durations that each animal stands, sits, lies down, or eats. FIG. 18 is a diagram 1800 that shows an example of behavior information collected for pigs having tags "B1," "B22," "B333", . . . , "P333." In FIG. 18, an image 1802 shows pigs that are being monitored by the system 100, and a chart 1804 shows statistical information for various behaviors of each pig being monitored. Harmful behaviors of the animals, such as fighting or biting, can be detected and alerts can be sent to human operators. The animal detection method can be applied to many types of animals, such as pigs, cows, horses, sheep, lambs, llamas, alpacas, dogs, or cats. Multiple types of animals can be detected at the same time. Multiple cameras can be directed at the animals, and the detection results based on the images from the multiple cameras can be combined. The detection method can also be used to identify people, and can be useful in, e.g., detecting the poses of actors in a film setting. The detection method can detect individual body parts of people, detect groups of body parts of the people, then associate the body parts of each person in order to detect each individual person.

In the animal detection method described above, the neural network outputs two sets of channels. The first set of channels (e.g., channels 1-4 in Table 1) have information about the positions of individual body parts, such as shoulders, tails, left ears, and right ears. The second set of channels (e.g., channels 5-16 in Table 2 of FIG. 15) have information about vector associations of pairs of body parts, such as relative positions of left ears to corresponding shoulders, relative positions of shoulders to corresponding left ears, relative positions of right ears to corresponding shoulders, relative positions of shoulders to corresponding right ears, relative positions of shoulders to corresponding tails, and relative positions of tails to corresponding shoulders. By combining information from the first set of channels (having information about positions of individual body parts) and the second set of channels (having information about pairwise associations of body parts), the body positions and orientations of the animals can be detected more accurately, as compared to conventional methods.

The detection method described above can be generalized to implement a multi-part detection method for detecting objects having multiple parts, in which the objects can include, e.g., humans, animals, robots, vehicles, or machines. The multi-part detection method uses a convolutional neural network having N1 sets of channels, N1>1, in which for each i, 1≤i≤N1, the i-th set of channels is trained to detect a number Pi of body parts together, and Pi are different from one another for all i, 1≤i≤N1. The following describes some examples of the generalized detection method.

Example 1: In the first example, N1=2, P1=1, and P2=2. In this example, a neural network is trained to detect individual body parts of each object, and also detect pairs of body parts of each object. This is similar to the neural network described in FIG. 4.

Example 2: In this example, N1=2, P1=1 and P2=3. In this example, the neural network is trained to detect individual body parts of each object, and also detect triplets of body parts of each object. The output of the neural network can have a first set of channels that have information about the locations of individual body parts, and a second set of channels that have information about the vector associations of three body parts of each object. For example, if the objects to be detected are pigs, for the second set of channels, the neural network can be trained to detect left ear—shoulder—tail together, detect right ear—shoulder—tail together, and detect left ear—shoulder—right ear together. The detected left ear—shoulder—tail group can be represented using, e.g., two vector associations, including a first vector indicating the position of the tail relative to the shoulder and a second vector indicating the position of the left ear relative to the shoulder. The detected right ear—shoulder—tail group can be represented using, e.g., two vector associations, including a first vector indicating the position of the tail relative to the shoulder and a second vector indicating the position of the right ear relative to the shoulder. The detected left ear—shoulder—right ear group can be represented using, e.g., two vector associations, including a first vector indicating the position of the left ear relative to the shoulder and a second vector indicating the position of the right ear relative to the shoulder.

The first set of channels provide information about the complete set of detected body part locations that can be represented by an equation similar to Equation (3). The second set of channels provide information that can be used to estimate the locations of associated parts using an equation similar to Equation (4). The association distance between parts can be determined using an equation similar to Equation (5), and the association distances can form distance matrices similar to those of Equation (6). An optimal assignment for groups of three body parts that minimizes the sum of distances can be obtained by applying the Hungarian assignment algorithm to each distance matrix.

Example 3: In the third example, N1=3, P1=1, P2=2, and P3=3. In this example, the neural network is trained to detect individual body parts of each object, detect pairs of body parts of each object, and also detect groups of three body parts of each object. The output of the neural network can have a first set of channels that have information about the locations of individual body parts, a second set of channels that have information about the locations of pairs of body parts, and a third set of channels that have information about the vector associations of three body parts of each object.

The first set of channels provide information about the complete set of detected body part locations that can be represented by an equation similar to Equation (3). The second and third sets of channels provide information that can be used to estimate the locations of associated parts using an equation similar to Equation (4). The association distance between parts can be determined using an equation similar to Equation (5), and the association distances form distance matrices similar to those of Equation (6). An optimal assignment for pairs of body parts and groups of three body parts that minimizes the sum of distances can be obtained by applying the Hungarian assignment algorithm to each distance matrix.

The difference between example 1 and example 3 is that in example 3, the neural network additionally generates information about vector associations of three body parts. This may be useful in more accurately associating the body parts of the same objects in which the objects are located close to one another.

Example 4: In the fourth example, N1=4, P1=1, P2=2, P3=3, and P4=4. In this example, the neural network is trained to detect individual body parts of each object, detect pairs of body parts of each object, detect groups of three body parts of each object, and also detect groups of four body parts of each object. The output of the neural network can have a first set of channels that have information about the locations of individual body parts, a second set of channels that have information about the locations of pairs of body parts, a third set of channels that have information about the vector associations of three body parts of each object, and a fourth set of channels that have information about the vector associations of four body parts of each object.

The first set of channels provide information about the complete set of detected body part locations that can be represented by an equation similar to Equation (3). The second, third, and fourth sets of channels provide information that can be used to estimate the locations of associated parts using an equation similar to Equation (4). The association distance between parts can be determined using an equation similar to Equation (5), and the association distances form distance matrices similar to those of Equation (6). An optimal assignment for pairs of body parts, groups of three body parts, and groups of four body parts that minimizes the sum of distances can be obtained by applying the Hungarian assignment algorithm to each distance matrix.

The difference between example 3 and example 4 is that in example 4, the neural network additionally generates information about vector associations of four body parts. Such a neural network may be useful in a system that is configured to detecting objects that have many recognizable body parts, such as industrial robots having multiple arms (e.g., six arms or more) or machinery having many moving parts.

Example 5: For example, a system for use in movie studios can be configured to detect movements of body parts of actors to provide data that are useful in generating computer animated characters that have corresponding body part movements. For example, suppose a director wishes to process a video of a battle scene having a large number of fighters and needs to track the movements of each individual fighters. One way to achieve this is to use a detection system that can detect locations of body parts of the fighters, such as the locations of, e.g., the heads, necks, left shoulders, right shoulders, chests, abdomens, upper backs, lower backs, upper left arms, upper right arms, left elbows, right elbows, left forearms, right forearms, left wrists, right wrists, left hands, right hands, hips, left upper legs, right upper legs, left lower legs, right lower legs, left feet, right feet, etc., and pairs of the body parts mentioned above. The individual body parts can be joined through part association techniques described above.

In some of the examples described above, the system detects animals in images taken from one camera. For example, the images shown in FIGS. 6, 7, 11, 12, and 18 were taken using one camera positioned above an enclosed pig pen. In some examples, if a single camera cannot cover the entire area that needs to be covered, such that multiple cameras are used, there are two ways to combine the information obtained from the multiple cameras. In some implementations, the images from the multiple cameras are combined (e.g., stitched together) first to generate a combined image, then the combined image is sent to the neural network to detect the animals in the combined image. In some implementations, the animals in the image from each of the multiple cameras are detected, then the information about the detected animals seen from the multiple cameras are combined. When videos of the animals from the multiple cameras are used to detect animal behavior over time, the animals in the videos from each camera are detected and tracked. When an animal moves outside of the field of view of a first camera and enters the field of view of a second camera, the system keep track of whether the animal is in the video of the first camera or the second camera.

Particular embodiments of the invention have been described. Other embodiments are within the scope of the following claims. In addition, the actions recited in the claims can be performed in a different order and still achieve desirable results. For example, additional body parts, such as legs, can be detected and used to identify instances of animals (e.g., pigs) when the animals are lying down and the legs are visible in the images.

FIG. 19 shows an example of an hourglass-shaped network 1900 used by the animal detection method described above to convert images to 16-channel image-space instance detection maps. The network 1900 can be used instead of the network 500 in FIG. 5. The black arrows indicate a copy for depth concatenation. The gray depth crop layers indicate untrainable convolutional layers that isolates certain channels of the input. While the final output layer is used for training with mean squared error (MSE) regression, the output of the 3rd depth concatenation is used for forward inference. By including the 3×3 max pooling output of the channels 1-4 along with their original outputs, this allows for fast peak detection in post-processing.

In some implementations, instead of using the network 500 or 1900 with maxpooling and maxunpooling layers, the system 100 can use a network that adopts a more efficient U-net architecture. The architecture is characterized by the use of depth concatenations following transposed convolutions for upsampling. The depth concatenations serve two key purposes. First, this allows for accelerated training because there are more direct paths from the network output to earlier layers in the network. This advantage was demonstrated by the ResNet architecture and the DenseNet architecture. The second function of the depth concatenations is to allow the network to produce fine details in the output feature space. Early maxpooling layers remove spatial details and make it difficult for transposed convolutions to produce detailed outputs at higher resolutions. Thus, by concatenating the network output prior to maxpooling after each transposed convolution, the network has access to higher resolution details.

In some implementations, the system 100 can use a network that uses the DeepLabV3+ architecture. DeepLabV3+ is characterized by the use of atrous convolutions to preserve the feature-space resolutions of networks similar to ResNet that natively downsample by a factor of 64 from, for example, a 224×224 input to a 7×7 feature space. Instead of drastically downsampling the network, the atrous convolutions expand the reach of convolutions, making it possible to preserve the receptive field while maintaining spatial precision with a larger feature space. Furthermore, the DeepLabV3+ network finishes by processing the feature space with a set of narrow and wide atrous convolutions so that the network is able to reuse features from multiple scales instead of having to train feature extraction differently for big and small objects. In some examples, the DeepLabV3+ network architecture may have a lower recognition rate compared to the U-net architecture.

The U-net architecture includes several features that can make it more efficient as compared to the hourglass-shaped network 500 of FIG. 5. First, maxunpooling layers were removed and replaced with transposed convolutions. Maxunpooling operations are generally slower because they require the network to pass indices that vary from one image to another. Second, the output is left at a 4× downsampled resolution instead of upsampling all the way back up to the original resolution.

The objects/parts being detected are expected to be strictly larger than a 4×4 window in the input image resolution and sub-pixel interpolation is used to detect the real-valued locations within the feature space. Thus, this lower resolution output has sufficient spatial detail and it removes the burden of computing regional maximums over large image spaces. Third, the regional maximum values for the channels corresponding to body part locations are calculated within the network structure by a 3×3 maxpooling layer. This regional maximum computation happens on the graphics processing unit (GPU) during forward inference, and it adds a negligible increase to the time required by the GPU to process each image. Regional maximums are used to find local maximum responses indicating the pixel locations of target body parts. By performing maxpooling in-network and concatenating this output with the body part mapping prior to maxpooling, finding region maximums can be quickly performed with simple pixel-wise "is equal" comparison in post-processing.

Figure 21:
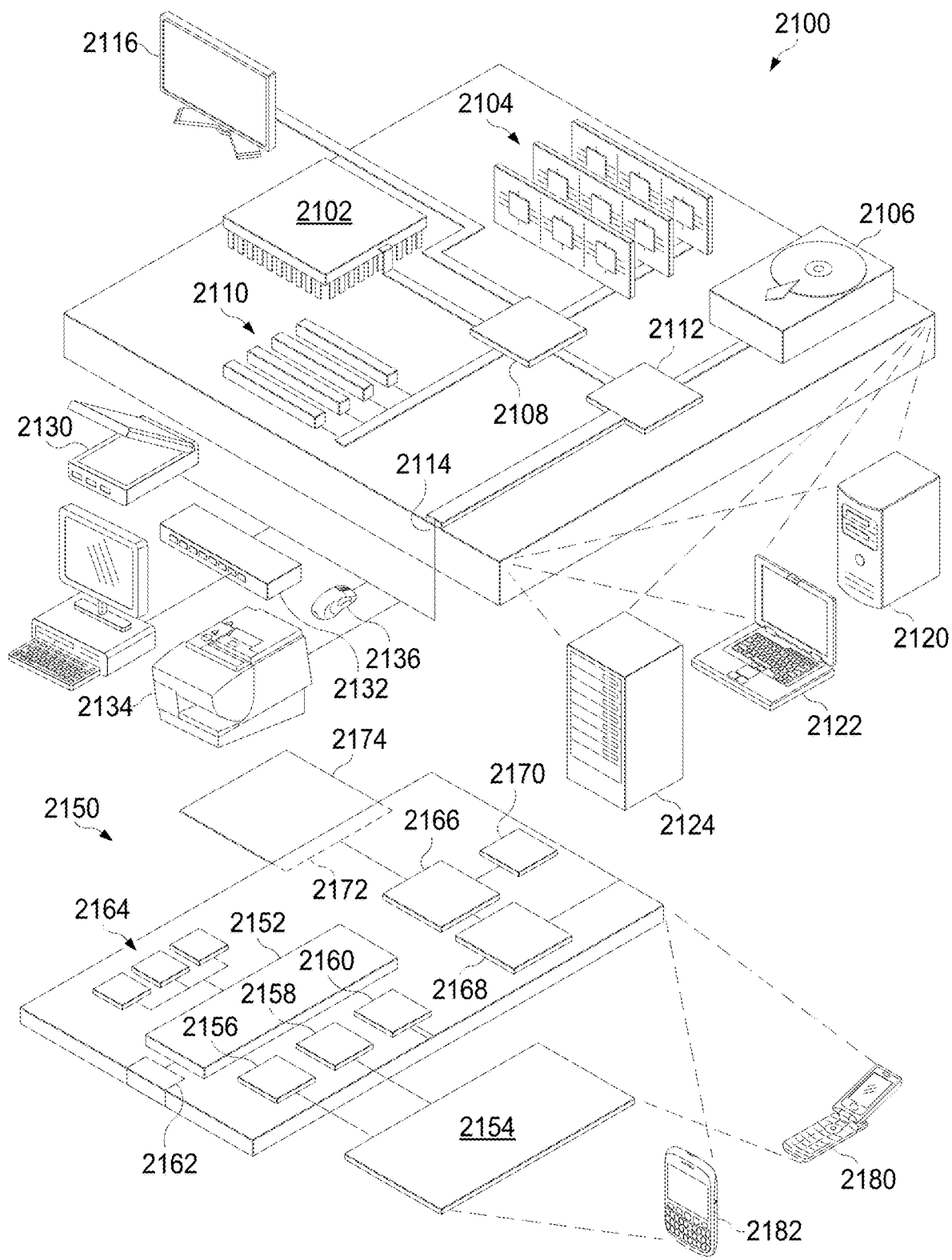
FIG. 21 shows an example of a computing device and a mobile computing device that can be used to implement the techniques described here.

FIG. 21 shows an example of a computing device 2100 and a mobile computing device 2150 that can be used to implement the techniques described here. The computing device 2100 is intended to represent various forms of digital computers, such as laptops, desktops, workstations, personal digital assistants, servers, blade servers, mainframes, and other appropriate computers. The mobile computing device 2150 is intended to represent various forms of mobile devices, such as personal digital assistants, cellular telephones, smart-phones, and other similar computing devices. Additionally, computing device 2100 or 2150 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to be limiting.

The computing device 2100 includes a processor 2102, a memory 2104, a storage device 2106, a high-speed interface 2108 connecting to the memory 2104 and multiple high-speed expansion ports 2110, and a low-speed interface 2112 connecting to a low-speed expansion port 2114 and the storage device 2106. Each of the processor 2102, the memory 2104, the storage device 2106, the high-speed interface 2108, the high-speed expansion ports 2110, and the low-speed interface 2112, are interconnected using various busses, and may be mounted on a common motherboard or in other manners as appropriate. The processor 2102 can process instructions for execution within the computing device 2100, including instructions stored in the memory 2104 or on the storage device 2106 to display graphical information for a GUI on an external input/output device, such as a display 2116 coupled to the high-speed interface 2108. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 2104 stores information within the computing device 2100. In some implementations, the memory 2104 is a volatile memory unit or units. In some implementations, the memory 2104 is a non-volatile memory unit or units. The memory 2104 may also be another form of computer-readable medium, such as a magnetic or optical disk.

The storage device 2106 is capable of providing mass storage for the computing device 2100. In some implementations, the storage device 2106 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 2102), perform one or more methods, such as those described above. The instructions can also be stored by one or more storage devices such as computer- or machine-readable mediums (for example, the memory 2104, the storage device 2106, or memory on the processor 2102).

The high-speed interface 2108 manages bandwidth-intensive operations for the computing device 2100, while the low-speed interface 2112 manages lower bandwidth-intensive operations. Such allocation of functions is an example only. In some implementations, the high-speed interface 2108 is coupled to the memory 2104, the display 2116 (e.g., through a graphics processor or accelerator), and to the high-speed expansion ports 2110, which may accept various expansion cards. In the implementation, the low-speed interface 2112 is coupled to the storage device 2106 and the low-speed expansion port 2114. The low-speed expansion port 2114, which may include various communication ports (e.g., USB, Bluetooth, Ethernet, wireless Ethernet) may be coupled to one or more input/output devices. Such input/output devices may include a scanner 2130, a printing device 2134, or a keyboard or mouse 2136. The input/output devices may also by coupled to the low-speed expansion port 2114 through a network adapter. Such network input/output devices may include, for example, a switch or router 2132.

The computing device 2100 may be implemented in a number of different forms, as shown in FIG. 21. For example, it may be implemented as a standard server 2120, or multiple times in a group of such servers. In addition, it may be implemented in a personal computer such as a laptop computer 2122. It may also be implemented as part of a rack server system 2124. Alternatively, components from the computing device 2100 may be combined with other components in a mobile device, such as a mobile computing device 2150. Each of such devices may contain one or more of the computing device 2100 and the mobile computing device 2150, and an entire system may be made up of multiple computing devices communicating with each other.

The mobile computing device 2150 includes a processor 2152, a memory 2164, an input/output device such as a display 2154, a communication interface 2166, and a transceiver 2168, among other components. The mobile computing device 2150 may also be provided with a storage device, such as a micro-drive or other device, to provide additional storage. Each of the processor 2152, the memory 2164, the display 2154, the communication interface 2166, and the transceiver 2168, are interconnected using various buses, and several of the components may be mounted on a common motherboard or in other manners as appropriate.

The processor 2152 can execute instructions within the mobile computing device 2150, including instructions stored in the memory 2164. The processor 2152 may be implemented as a chipset of chips that include separate and multiple analog and digital processors. For example, the processor 2152 may be a Complex Instruction Set Computers (CISC) processor, a Reduced Instruction Set Computer (RISC) processor, or a Minimal Instruction Set Computer (MISC) processor. The processor 2152 may provide, for example, for coordination of the other components of the mobile computing device 2150, such as control of user interfaces, applications run by the mobile computing device 2150, and wireless communication by the mobile computing device 2150.

The processor 2152 may communicate with a user through a control interface 2158 and a display interface 2156 coupled to the display 2154. The display 2154 may be, for example, a Thin-Film-Transistor Liquid Crystal Display (TFT) display or an Organic Light Emitting Diode (OLED) display, or other appropriate display technology. The display interface 2156 may comprise appropriate circuitry for driving the display 2154 to present graphical and other information to a user. The control interface 2158 may receive commands from a user and convert them for submission to the processor 2152. In addition, an external interface 2162 may provide communication with the processor 2152, so as to enable near area communication of the mobile computing device 2150 with other devices. The external interface 2162 may provide, for example, for wired communication in some implementations, or for wireless communication in other implementations, and multiple interfaces may also be used.

The memory 2164 stores information within the mobile computing device 2150. The memory 2164 can be implemented as one or more of a computer-readable medium or media, a volatile memory unit or units, or a non-volatile memory unit or units. An expansion memory 2174 may also be provided and connected to the mobile computing device 2150 through an expansion interface 2172, which may include, for example, a Single In-Line Memory Module (SIMM) card interface. The expansion memory 2174 may provide extra storage space for the mobile computing device 2150, or may also store applications or other information for the mobile computing device 2150. Specifically, the expansion memory 2174 may include instructions to carry out or supplement the processes described above, and may include secure information also. Thus, for example, the expansion memory 2174 may be provided as a security module for the mobile computing device 2150, and may be programmed with instructions that permit secure use of the mobile computing device 2150. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices (for example, processor 2152), perform one or more methods, such as those described above. The instructions can also be stored by one or more storage devices, such as one or more computer- or machine-readable mediums (for example, the memory 2164, the expansion memory 2174, or memory on the processor 2152). In some implementations, the instructions can be received in a propagated signal, for example, over the transceiver 2168 or the external interface 2162.

The mobile computing device 2150 may communicate wirelessly through the communication interface 2166, which may include digital signal processing circuitry where necessary. The communication interface 2166 may provide for communications under various modes or protocols, such as Global System for Mobile communications (GSM) voice calls, Short Message Service (SMS), Enhanced Messaging Service (EMS), or Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS), among others. Such communication may occur, for example, through the transceiver 2168 using a radio-frequency. In addition, short-range communication may occur, such as using a Bluetooth, Wi-Fi, or other such transceiver. In addition, a Global Positioning System (GPS) receiver module 2170 may provide additional navigation- and location-related wireless data to the mobile computing device 2150, which may be used as appropriate by applications running on the mobile computing device 2150.

The mobile computing device 2150 may also communicate audibly using an audio codec 2160, which may receive spoken information from a user and convert it to usable digital information. The audio codec 2160 may likewise generate audible sound for a user, such as through a speaker, e.g., in a handset of the mobile computing device 2150. Such sound may include sound from voice telephone calls, may include recorded sound (e.g., voice messages, music files, etc.) and may also include sound generated by applications operating on the mobile computing device 2150.

The mobile computing device 2150 may be implemented in a number of different forms, as shown in the figure. For example, it may be implemented as a cellular telephone 2180. It may also be implemented as part of a smart-phone, personal digital assistant, or other similar mobile device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, neural networks other than the ones described above can be used in the animal detection system. Cameras can be mounted at various positions and orientations relative to the pen in order to capture images of the animals from various viewpoints. One or more cameras can be mounted on one or more drones that hover above the animals. The animal detection system can be used to detect animals in a herd that roams freely, in which the one or more drones follow the herd of animals as they move to different locations. For example, the animal detection system is useful in monitoring behaviors of animals that are subject to experiments or testing. In addition, the logic flows depicted in the figures do not require the particular order shown, or sequential order, to achieve desirable results. In addition, other actions may be provided, or actions may be eliminated, from the described flows, and other components may be added to, or removed from, the described animal detection system. Accordingly, other implementations are within the scope of the following claims.

What is claimed is:

1. A computer-implemented method of recognizing animals, the method comprising:
    recognizing, by using at least one computer, a plurality of body parts of a plurality of animals based on at least one image of the animals, in which the plurality of body parts include a plurality of types of body parts, including determining first estimated positions of the recognized body parts in the at least one image;
    estimating, by using the at least one computer, a plurality of first associations of body parts based on the at least one image of the animals, each first association of body parts associates a body part of an animal with at least one other body part of the same animal, including determining relative positions of the body parts in each estimated first association of body parts in the at least one image;
    determining, based on the first estimated positions of the recognized body parts and the relative positions of the body parts in the estimated first associations of body parts, second associations of body parts in which each second association of body parts associates a recognized body part of an animal with at least one other recognized body part of the same animal; and
    recognizing individual animals in the at least one image based on the second associations of body parts of the animals.

2. The method of claim 1, comprising processing the at least one image to generate an output that includes a plurality of channels of data, wherein each channel of a first subset of the plurality of channels has information about probability values of possible locations of a particular type of body part of the animals in the at least one image, and processing the channels of data to determine the first estimated positions of the recognized body parts in the at least one image.

3. The method of claim 1, comprising adapting the recognition of the body parts to animals of varying sizes by applying a Gaussian kernel defined by a larger standard deviation for processing body parts of larger animals in the at least one image of the animals, and applying a Gaussian kernel defined by a smaller standard deviation for processing body parts of smaller animals in the at least one image of the animals.

4. The method of claim 1, comprising determining the second associations of body parts by applying a Hungarian assignment algorithm to an association distance matrix to minimize a sum of association distances of a plurality of pairs of body parts.

5. The method of claim 1 in which recognizing the plurality of body parts comprises using at least one neural network to recognize shoulder portions, tail portions, left ears, and right ears of the animals based on the at least one image of the animals.

6. The method of claim 5 in which estimating the plurality of first associations of body parts comprises using the at least one neural network to estimate first associations of shoulder portions and tail portions, first associations of shoulder portions and left ears, and first associations of shoulder portions and right ears of the animals.

7. The method of claim 5 in which determining the second associations of body parts comprises, for at least a subset of the recognized shoulder portions, associating each recognized shoulder portion with a recognized tail portion, associating each recognized shoulder portion with a recognized left ear, and associating each recognized shoulder portion with a recognized right ear, wherein the second associations are determined in a way to reduce an overall difference between the first estimated positions of the body parts and second estimated positions of body parts that are determined based on the relative positions of the body parts in the recognized first association of body parts.

8. The method of claim 5 in which the first estimated positions are represented by $$\{p_1, \ldots, p_{N_p}\} = \{(x_{p1}, y_{p1}), \ldots, (x_{pN_p}, y_{pN_p})\} \text{ for } p \in \{l, r, s, t\},$$

wherein l represents left ear, r represents right ear, s represents shoulder portion, t represents tail portion, $N_p$ represents the number of body parts for body part p, the first associations of body parts can be represented by an association mapping:

$$[M_{l \to s}^x M_{l \to s}^y M_{s \to l}^x M_{s \to l}^y M_{r \to s}^x M_{r \to s}^y M_{s \to r}^x M_{s \to r}^y M_{s \to t}^x M_{s \to t}^y M_{t \to s}^x M_{t \to s}^y],$$

wherein l represents left ear, r represents right ear, s represents shoulder portion, t represents tail portion, $M_{l \to s}^x$ represents an image space mapping from left ears to shoulders in the x direction, $M_{l \to s}^y$ represents an image space mapping from left ears to shoulders in the y direction, $M_{s \to l}^x$ represents an image space mapping from shoulders to left ears in the x direction, $M_{s \to l}^y$ represents an image space mapping from shoulders to left ears in the y direction, $M_{r \to s}^x$ represents an image space mapping from right ears to shoulders in the x direction, $M_{r \to s}^y$ represents an image space mapping from right ears to shoulders in the y direction, $M_{s \to r}^x$ represents an image space mapping from shoulders to right ears in the x direction, $M_{s \to r}^y$ represents an image space mapping from shoulders to right ears in the y direction, $M_{s \to t}^x$ represents an image space mapping from shoulders to tails in the x direction, $M_{s \to t}^y$ represents an image space mapping from shoulders to tails in the y direction, $M_{t \to s}^x$ represents an image space mapping from tails to shoulders in the x direction, and $M_{t \to s}^y$ represents an image space mapping from tails to shoulders in the y direction, an estimated location of an associated body part q from location $p_n$ is represented by:

$$(p \to q)_n = (x_{p_n} - M_{p \to q}^x(x_{p_n}, y_{p_n}), y_{p_n} - M_{p \to q}^y(x_{p_n}, y_{p_n})) \text{ for all } n=1, \ldots, N_p,$$

an association distance between body parts $p_n$ and $q_m$ is represented by $$d(p_n, q_m) = \frac{|(p \to q)_n - q_m| + |(q \to p)_m - p_n|}{2},$$

wherein |a| denotes an L2-norm of vector a, association distances of the body parts can form three distance matrices that are represented by:

$$D_{p,q} = \begin{bmatrix} d(p_1, q_1) & d(p_1, q_2) & \ldots & d(p_1, q_{N_q}) \\ d(p_2, q_1) & d(p_2, q_2) & \ldots & d(p_2, q_{N_q}) \\ \vdots & \vdots & \ddots & \vdots \\ d(p_{N_p}, q_1) & d(p_{N_p}, q_2) & \ldots & d(p_{N_p}, q_{N_q}) \end{bmatrix},$$

wherein (p=l, q=s) for the first distance matrix, (p=r, q=s) for the second distance matrix, and (p=s, q=t) for the third distance matrix, and the second associations of body parts are determined in a way so as to minimize a sum of the association distances.

9. The method of claim 8 in which the second associations of body parts are determined by applying a Hungarian assignment algorithm to each distance matrix to minimize the sum of the association distances.

10. The method of claim 1 in which determining the first estimated positions of the recognized body parts comprises determining first estimated positions of the recognized shoulder portions, first estimated positions of the recognized tail portions, first estimated positions of the recognized left ears, and first estimated positions of the recognized right ears of the animals.

11. The method of claim 1 in which determining the first estimated positions of the recognized body parts comprises determining the first estimated positions based on regional max response detection.

12. The method of claim 11 in which determining the first estimated positions based on regional max response detection comprises determining:

$$\{p\} = \{(x,y) | M_p(x,y) \geq M_p(x',y') \text{ for all } (x',y') \in \mathcal{R}_{(x,y)}\}$$
$$\text{for } p \in \{l, r, s, t\}, \text{ wherein}$$

$M_p$ represents an image space map for body part $p \in \{l, r, s, t\}$ represents left ear, r represents right ear, s represents shoulder portion, t represents tail portion, $R_{(x,y)}$ represents a region surrounding image space location (x,y), the first estimated positions are represented by $$\{p_1, \ldots, p_{N_p}\} = \{(x_{p1}, y_{p1}), \ldots, (x_{pN_p}, y_{pN_p})\} \text{ for } p \in \{l, r, s, t\}, \text{ and } N_p$$

represents the number of body parts for body part p.

13. The method of claim 1, comprising tracking positions of the individual animals over time by tracking positions of pairs of recognized shoulder portions and recognized tail portions of the individual animals.

14. The method of claim 1 in which the animals comprise at least one of pigs, cows, horses, sheep, lambs, llamas, alpacas, dogs, or cats.

15. The method of claim 1 in which the one or more images comprise one or more images of animals in an enclosed environment, and the one or more images are captured by at least one camera positioned above the animals.

16. A computer-implemented method of recognizing pigs, the method comprising:
    applying at least one recognition module to at least one image of pigs to recognize body parts of the pigs, in which the body parts include shoulder portions, tail portions, left ears, and right ears of the pigs,
        wherein the at least one recognition module outputs estimated locations of the recognized shoulder portions, the recognized tail portions, the recognized left ears, and the recognized right ears in the at least one image;
    applying the at least one recognition module to the at least one image of pigs to estimate relative positions of pairs of body parts of the pigs, including estimating a position of a shoulder portion relative to a corresponding tail portion for each of a plurality of estimated tail portions in the image, estimating a position of a shoulder portion relative to a corresponding left ear portion for each of a plurality of estimated left ear portions in the image, and estimating a position of a shoulder portion relative to a corresponding right ear portion for each of a plurality of estimated right ear portions in the image, and
    determining, for each of at least some of the recognized shoulder portions, an association with a recognized tail portion, a recognized left ear, and a recognized right ear of the same pig based on (i) the estimated positions of the recognized shoulder portions, tail portions, left ears and right rears, and (ii) the estimated relative positions of the shoulder portions and corresponding tail portions, the estimated relative positions of the shoulder portions and corresponding left ear portions, and the estimated relative positions of the shoulder portions and corresponding right ear portions; and
    recognizing individual pigs in the at least one image of pigs based on the associations of recognized shoulder portions with recognized tail portions.

17. The method of claim 16, comprising applying the at least one recognition module to the at least one image of pigs to estimate relative positions of pairs of body parts of the pigs, including estimating a position of a tail portion relative to a corresponding shoulder portion for each of a plurality of estimated shoulder portions in the image, estimating a position of a left ear portion relative to a corresponding shoulder portion for each of the plurality of estimated shoulder portions, and estimating a position of a right ear portion relative to a corresponding shoulder portion for each of the plurality of estimated shoulder portions,
    wherein the determining, for each of at least some of the recognized shoulder portions, an association with a recognized tail portion, a recognized left ear, and a recognized right ear of the same pig is also based on the estimated relative positions of the tail portions and the corresponding shoulder portions, the estimated relative positions of the left ear portions and the corresponding shoulder portions, and the estimated relative positions of the right ear portions and the corresponding shoulder portions.

18. The method of claim 16, comprising:
    applying the at least one recognition module to the at least one image of pigs to estimate relative positions of pairs of body parts of the pigs, including
        estimating a position of a shoulder portion relative to a corresponding tail portion for each pixel in the image,
        estimating a position of a shoulder portion relative to a corresponding left ear portion for each pixel in the image, assuming there is a left ear portion at each pixel, and
        estimating a position of a shoulder portion relative to a corresponding right ear portion for each pixel in the image, assuming there is a right ear portion at each pixel.

19. The method of claim 16, comprising processing the at least one image to generate an output that includes a plurality of channels of data,
    wherein each channel of a first subset of the plurality of channels has information about probability values of possible locations of a particular type of body part of the animals in the at least one image, and
    processing the channels of data to determine the first estimated positions of the recognized body parts in the at least one image.

20. The method of claim 16, comprising adapting the recognition of the body parts to pigs of varying sizes by applying a Gaussian kernel defined by a larger standard deviation for processing body parts of larger pigs in the at least one image of the pigs, and applying a Gaussian kernel defined by a smaller standard deviation for processing body parts of smaller pigs in the at least one image of the pigs.

21. The method of claim 16, comprising determining the second associations of body parts by applying a Hungarian assignment algorithm to an association distance matrix to minimize a sum of association distances of a plurality of pairs of body parts.

22. A system for recognizing animals, comprising:
    at least one body-part recognition module that is configured to recognize body parts of animals in at least one image of the animals, in which the body parts include a plurality of types of body parts, and the at least one recognition module outputs first estimated positions of the recognized body parts in the at least one image;
    the at least one body-part recognition module is further configured to estimate first associations of body parts of the animals, in which each first association of body parts associates a body part of an animal with at least one other body part of the same animal, and the at least one recognition module outputs relative positions of the body parts in each estimated first association of body parts;
    an association module configured to determine, based on the first estimated positions of the recognized body parts and the relative positions of the body parts in the estimated first associations of body parts, second associations of body parts in which each second association of body parts associates a recognized body part of an animal with at least one other recognized body part of the same animal; and an animal recognition module configured to recognize individual animals in the at least one image based on the second associations of body parts of the animals.

* * * * *